MAGNETIC-TAPE INFORMATION STORAGE AND RETRIEVAL

Original Filed July 19, 1960 8 Sheets-Sheet 1

INVENTOR
HENRY T. HEATWOLE
BY Wymne & Finken
ATTORNEYS

MAGNETIC-TAPE INFORMATION STORAGE AND RETRIEVAL

Original Filed July 19, 1960 8 Sheets-Sheet [illegible]

INVENTOR

HENRY T. HEATWOLE

BY [signature]

ATTORNEYS

Jan. 23, 1968 H. T. HEATWOLE 3,365,702

MAGNETIC-TAPE INFORMATION STORAGE AND RETRIEVAL

Original Filed July 19, 1960 8 Sheets-Sheet 3

INVENTOR

HENRY T. HEATWOLE

BY Wynne & Fricke (signature)

ATTORNEYS

Jan. 23, 1968 H. T. HEATWOLE 3,365,702

MAGNETIC-TAPE INFORMATION STORAGE AND RETRIEVAL

Original Filed July 19, 1960 8 Sheets-Sheet 4

INVENTOR

HENRY T. HEATWOLE

BY

ATTORNEYS

INVENTOR

HENRY T. HEATWOLE

BY Wagner & Fiekser [signature]
ATTORNEYS

INVENTOR
HENRY T. HEATWOLE
BY
Wynne & Finken
ATTORNEYS

INVENTOR
HENRY T. HEATWOLE
BY Wyman & Fischer
ATTORNEYS

Jan. 23, 1968 H. T. HEATWOLE 3,365,702

MAGNETIC-TAPE INFORMATION STORAGE AND RETRIEVAL

Original Filed July 19, 1960 8 Sheets-Sheet 8

INVENTOR
HENRY T. HEATWOLE

BY Wynne & Finken
ATTORNEYS

United States Patent Office
3,365,702
Patented Jan. 23, 1968

3,365,702
MAGNETIC-TAPE INFORMATION STORAGE AND RETRIEVAL

Henry T. Heatwole, Silver Spring, Md., assignor, by mesne assignments, to Herner & Company, Washington, D.C., a corporation of the District of Columbia
Continuation of application Ser. No. 43,946, July 19, 1960. This application Jan. 14, 1964, Ser. No. 337,680
2 Claims. (Cl. 340—172.5)

ABSTRACT OF THE DISCLOSURE

Information retrieval apparatus wherein magnetic tape bearing address information and correlated subject information in the form of multi-digit numbers is searched for addresses corresponding to desired subject information. The tape is searched at high speed for the desired subject information and upon finding the same the tape is stopped, reversed and moved forward at low speed to detect and read out the address corresponding to the desired subject. The tape is then moved forwardly at high speed to continue the search. The apparatus employs a plurality of multi-pole switches, each switch corresponding to a digit in the multidigit number for selecting the desired subject number and an ANY pole for disabling the selecting means whereby generic searches can be conducted.

This invention relates to systems, methods and apparatus in which information is recorded, searched and retrieved by electronic means.

This application is a continuation of application S.N. 43,946, filed July 19, 1960, and now abandoned.

The development of high speed data processing systems has made possible the application of electronic techniques to the problem of storage, selection and correlation of information. Magnetic storage and retrieval systems employing magnetic tape are known. Such systems are capable of searching and correlating information at very high speeds. Read out apparatus, such as printers capable of operating at such high speeds are very complex and expensive. Accordingly, most systems now in use employ a buffer or intermediate storage means for temporarily holding selected information until slower speed, more inexpensive printers are able to print out the information. Buffer systems are complex and expensive.

One of the principal objects of the present invention is to provide a magnetic tape storage and retrieval system which eliminates a buffer and which employs relatively inexpensive slow speed read out or printing means.

Another object of the invention is to provide a magnetic tape storage system which is inexpensive yet reliable for performing rapid searches and correlation of recorded information.

Another object is to provide a magnetic tape storage system which employs decimal coding and which may be operated by relatively unskilled personnel.

A further object of the invention is to provide a magnetic tape storage system which may be searched for a specific subject or class of information, generic classes of information, multiple subjects or for correlated subject matter.

Further objects and advantages of the invention will be apparent to those skilled in the art.

Broadly, one phase of my invention includes apparatus for retrieving desired information from a magnetic tape having subject information recorded thereon and entry information recorded thereon corresponding to the subject information, comprising selecting means for selecting the desired subject information, detecting means for detecting information, means for moving the tape at relatively high speed past the detecting means, control means for comparing information detected by the detecting means with the subject information selected by the selecting means responsive to an identity of compared information for stopping said tape, means responsive to the stopping of the tape for moving the tape at relatively low speed past the detecting means, and read out means operatively associated with the detecting means for reading out the entry information corresponding to the desired subject information while the tape is moving at relatively low speed.

In accordance with the invention, I also provide a method of retrieving desired information from a magnetic tape having subject information recorded thereon and entry information recorded thereon corresponding to the subject information comprising moving the tape at relatively high speed past detecting means, detecting subject information recorded on the tape, stopping the tape when the desired subject information is detected, moving said tape at relatively low speed past the detecting means and reading out entry information corresponding to the desired information while said tape is moving at said relatively low speed.

The invention is also directed to more specific methods, circuitry and apparatus for recording information on magnetic tape and for searching, comparing, correlating and reading out recorded information.

The invention will be described in terms of certain preferred embodiments (illustrative of the principals of the invention) which are schematically shown in the accompanying drawings.

*General description*

According to the invention, the information is recorded on magnetic tape, preferably in the form of decimal numbers which have been converted into a suitable electrical code. Suitable codes include binary signals or signals of different amplitudes to be further described.

The information consists of subject information and entry information. Thus a given entry (or address) may contain any number of subjects. The purpose of a given search may be, for example, to find all entries that contain a specific subject, both of two subjects, etc.

Figure 3:
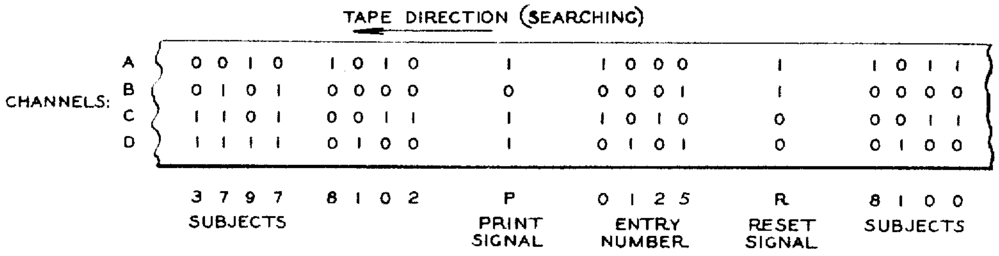
FIG. 3 is a schematic illustration of a portion of magnetic tape having information recorded thereon.

FIG. 3 illustrates schematically a portion of tape having subject and entry information recorded thereon. In this example, a binary code is employed (to be further described) and the subjects and entries are identified as four digit decimal numbers. As is apparent, the portion of the tape shown in FIG. 3 includes subjects 3797 and 8102 which are contained in a block corresponding to entry number 0125. The succeeding entry block contains subject number 8100 and may, of course, include many other subjects. The tape also has recorded thereon a read out or print signal P and a reset signal R which are further described herein. The information and signals are recorded in the following order in each block with relation to the tape direction for searching, subject information, print signal, entry number and reset signal.

In a searching operation, the tape shown in FIG. 3 moves from right to left past a reading head at relatively high speed.

When the reading head and associated detecting means detect a subject which is the object of the search, the tape is stopped. The tape is then moved at a relatively slow speed past the reading head. When the print signal is detected, read out means are energized and the entry number following the print signal is read out and printed. Subsequent detection of the reset signal starts the tape moving at high speed again and resets the detecting means to detect desired subject information appearing in subsequent blocks recorded on the tape. This tape movement operation is referred to herein as the "double-take" operation.

As an example, assume the search is to locate all entries containing the subject 3797. The tape of FIG. 3 is moving at relatively high speed from right to left. When subject 3797 is detected, the tape is stopped and thereafter moves at a relatively low speed. When the print signal P is detected, the read out circuit is activated and the printer then prints out entry number 0125. Subsequent detection of reset signal R resets the detecting circuits and starts the tape moving at relatively high speed to continue the search.

In a preferred embodiment, the tape direction is reversed a predetermined short distance after detection of desired subject information before the slow forward speed for read out is started. This is done because the tape reels have a tendency to coast somewhat after energizing tape braking means. Accordingly, it is preferred to back up the tape a short distance to assure that the print signal P in the entry block containing the desired subject information is positioned ahead of the reading head before starting the slow speed read out operation.

Figure 12:
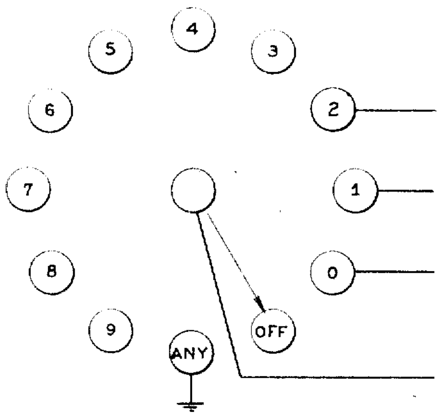
FIG. 12 is a partial circuit diagram of a comparing circuit.

A search may be based on any one, two or three subjects classification numbers. Each of the three subjects is represented on a control panel by a row of four rotary switches such as shown in FIG. 12. Each switch can be set at any digit from 0 through 9, at OFF, or at ANY. A correlation rotary switch on the panel may be set at 1, 2 or 3 in the embodiment described herein. Other embodiments may utilize 5 or more digit numbers and the search may be based on more subjects.

To perform a one-subject search, the operator sets the required four-digit subject number (in decimal form), on any of the three rows of subject switches, turning the other switches to OFF. The correlation switch is set at 1.

The machine will then search the recorded information for entries containing this subject; it will type out the identifying number of each such entry.

To perform a two-subject search, the subjects are set on two rows of switches, with the other row set at OFF. If the correlation switch is now set at 1, the machine will type an output for each entry that is classified under either of the two specified subjects. If the correlation switch is set at 2, the machine will type an output only for those entries that are classified under both of the specified subjects.

To perform a three-subject search, the three subjects are set on the three rows of switches. If the correlation switch is set at 1, the machine will type an output for each entry that is classified under one of the three specified subjects. If the correlation switch is set at 2, the machine will type an output for each entry that is classified under any two of the three specified subjects. If the correlation switch is set at 3, the machine will type an output for each entry that is classified under all three of the specified subjects.

Generic searching is possible by use of the ANY position on the rotary switches. For example, assume a one-subject search in which a row of switches is set at 3–4–7–ANY. The correlation switch is set at 1. The machine will now type an output for each entry classified under any one of ten subjects, from 3470 through 3479. An ANY position is provided on each of the four rotary switches for each of three subjects, although this feature will, in most classification systems, be useful only in the last digit, or the last two digits of the four-digit subject classification number.

Figure 1:
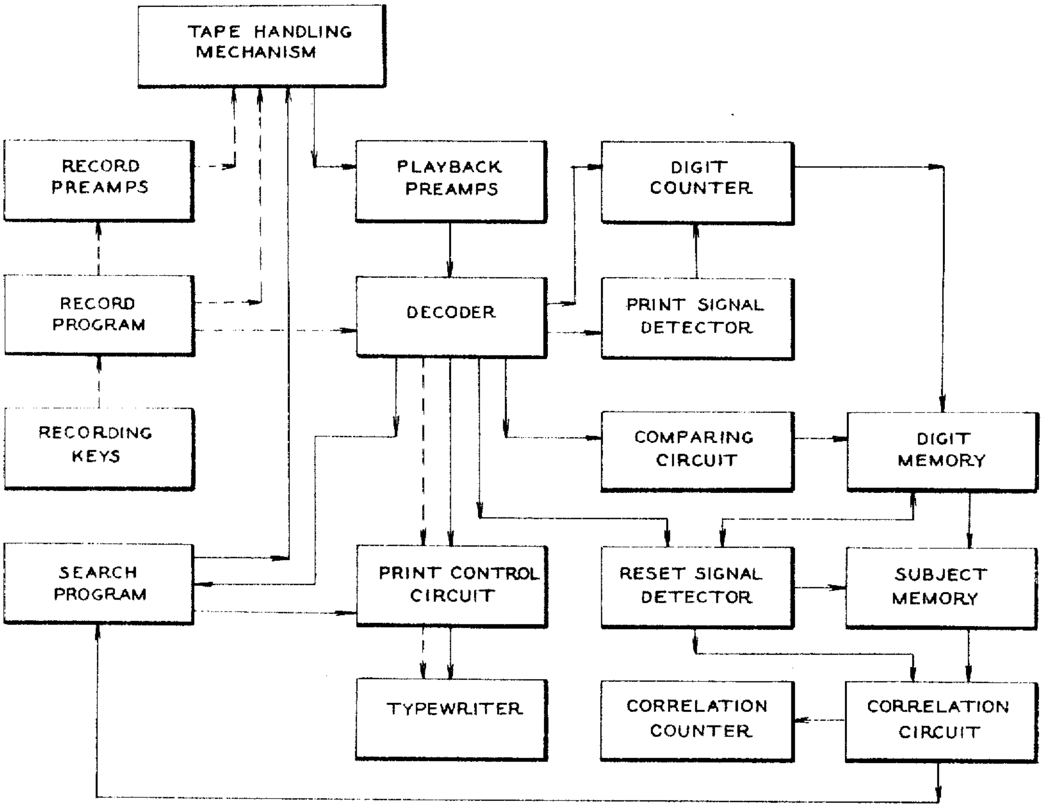
FIG. 1 is a block diagram of the components and functions of a preferred system constructed in accordance with the invention.

FIGURE 1 is a simplified block diagram showing the relationship between the principal components of the invention. During recording or searching, the tape mechanism is operated automatically through a program circuit. The manual control section of the panel makes optional manual control of the tape mechanism possible. A rotary FUNCTION switch offers a choice of five functions:

(1). Record. This position makes it possible to record information on the tape by pressing the numbered push-button switches on the record section of the control panel.

(2) Circuit test. This position makes it possible to perform a complete operation test of the computer circuitry by pressing the record switches in a specified sequence and observing the neon indicator lights on the panel.

(3) Search program test. This position makes it possible to test the operation of the search program by using the recording keys to simulate digits received from the tape.

(4) Search and type. This position makes it possible to search the information stored on the tape and to type out the results of the search.

(5) Search and count. With the function switch in this position, the machine will search the recorded information, and indicate on a panel-mounted counter the number of entries that meet the specified search conditions. This position is used when the operator wishes to know only how many entries meet the specified conditions, rather than which ones. This will result in a saving of time, since the machine must slow down every time it types an output.

In FIG. 1, solid lines indicate the operation during searching; the broken lines indicate the operation during recording. When one of the record buttons is pressed, the record program is put into operation. A signal is coded on the tape. At the same time, the program sends a signal to the tape-handling mechanism to intermittently move the tape in response to release of record buttons whereby successive information may be coded on the tape.

Optionally, the coded signals supplied by the record program can be sent through the decoder and the print control circuit to the typewriter. In this way, the signals can be monitored as they are recorded for an accuracy check.

In searching, the tape mechanism moves the tape at relatively high speed, for example at 15 inches per second, and the coded signals received from the tape are supplied through the playback preamplifiers to the decoder. Decimal numbers in the output of the decoder are supplied to the comparing circuit. Signals from the decoder operate the digit counter. When a decimal digit received from the tape corresponds in value (as determined by the comparing circuit) and in position within a four-digit subject number (as determined by the comparing circuit and the digit counter) with a digit of one of the subjects being searched for, this fact is remembered by the digit memory. When all four digits of a subject number, as received from the tape, are respectively the same as the four digits of a subject being searched for, this fact is remembered by the subject memory. The digit counter clears the digit memory at the end of each four-digit subject number received from the tape.

When the number of subjects remembered by the subject memory equals the number of subjects specified for the search, the correlation circuit is operated; it advances a mechanical counter and sends a signal to the search program.

When the "print" signal is received from the tape, the print-signal detector disables the digit counter until the "reset" signal is received. This ensures that only subject numbers—not document or entry numbers, will be compared with the subject numbers specified for the search. It also ensures that the digit counter will be set on "1" at the beginning of the next entry received from the tape.

If no correlation is detected during search of a given entry, the "reset" signal at the end of that entry, through the reset signal detector, clears the digit memory, the subject memory and the correlation circuit. It also re-enables the digit counter so that counting will be resumed with the next digit received from the tape.

The decoder sends "print" and "reset" signals, when they are received from the tape, to the search program. If, during the search of a given entry, the search program has received a signal from the correlation circuit, the print signal of that entry will put the program into operation. The program stops the tape, reverses it through a short distance, and begins a low-speed search. When the print signal is reached again, the program enables the print control circuit so that document numbers, as received from the tape and decoded, will be typed out. When the "reset" signal appears again, the typewriter will line-space and return its carriage. When this action is completed, the search program will again stop the tape, dis-enable the print control circuit, reverse the tape a short distance and resume the normal 15 i.p.s. search. When the reset signal is passed again, all memory devices will be cleared by the reset signal detector so that the next entry can be searched.

*Tape handling mechanism*

Figure 2:
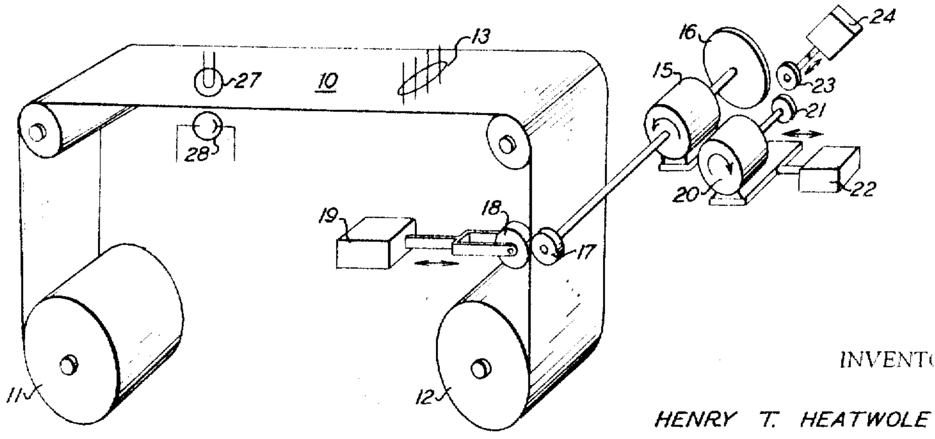
FIG. 2 is a schematic diagram illustrating a tape handling mechanism constructed in accordance with the invention.

FIG. 2 illustrates a tape drive mechanism constructed in accordance with the invention. In this figure, the tape 10 moves forward during searching from left to right. The tape is supplied from parent reel 11 and wound on take-up reel 12. The reading head is indicated at 13. The relatively high speed forward driving motor 15 is provided with a flywheel 16 and drive capstan 17. A capstan idler 18 is positioned opposite capstan 17 and is movable into engagement with tape 10 to press the tape against the capstan 17 by means of solenoid 19. Motor 15 runs counterclockwise and it is apparent that when capstan idler 18 is moved to clamp tape 10 between it and capstan 17, the tape will move from left to right.

To achieve slow speed forward operation, the power to motor 15 is cut off and electric power is delivered to motor 20 which rotates clockwise. The drive wheel 21 of motor 20 is moved into driving engagement with flywheel 16 by means of solenoid 22 which in the embodiment shown moves the entire motor assembly 20 and 22.

For slow speed reverse direction, power to motor 15 is cut off and motor 20 is energized. At the same time reverse idler 23 is moved by solenoid 24 to contact both drive wheel 21 and flywheel 16 while drive wheel 21 is out of contact with flywheel 16. For both slow speed forward and slow speed reverse direction, capstan idler 18 is moved to clamp the tape 10 against drive capstan 17. Also, for both slow speed forward and slow speed reverse operation, motor 15, being unenergized, rotates freely under the driving influence of motor 20.

In order to stop the tape, as when a desired subject is detected in a search, or between slow speed reverse and slow speed forward directions, magnetic brakes (not shown) on the reels 11 and 12 are energized. The tape mechanism is also provided with additional drive motors (not shown) for driving reels 11 and 12 at much higher speed, as for rewinding, etc.

In one embodiment, the relatively high speed searching operation is conducted at about 15 inches per second tape speed. The slow speed reverse and slow speed forward read out operations are conducted at about 1.5 inches per second tape speed.

The search program may, as has been pointed out, specify that all entries containing a specific subject be read out. In such cases, the detection of the desired subject stops the tape and read at slow speed is accomplished as discussed above. The search program might, however, specify a correlation-type search; i.e. all entries having both of two subjects, etc. In such cases the tape is not stopped after one of the subjects is detected, but the presence of such desired subject is remembered, by mechanism to be further described, and relatively high speed search of the entry is continued to determine if the other search conditions are met. If all the specified search conditions are met in a single entry block, then the above discussed stopping and slow speed read out takes place.

The reading and recording head 13 is positioned adjacent a conventional gate (not shown) which in its closed position moves the tape in close proximity to the head and in its open position releases the tape to enable free movement of the tape therethrough. The gate is actuated by a solenoid (not shown) as is well known in the art.

Operation of the various components of the tape mechanism is controlled by relays and by relay-operated solenoids. The principal functions of the transport mechanism as above described are:

(1) 15 i.p.s. forward
(2) 1½ i.p.s. forward
(3) 1½ i.p.s. reverse
(4) High speed forward
(5) High speed rewind Each of these five functions is controlled by a multiple-pole master relay (not shown). These relays control various operating relays in the following combinations:

(1) 15 i.p.s. forward: gate closed, capstan idler 18 engaged, 15 i.p.s. motor 15 on, low voltage A-C to takeup motor on takeup reel 12. (Idler engagement is delayed half a second by a conventional timing circuit, so that the motor shaft may come to full speed.)

(2) 1½ i.p.s. forward: gate closed, capstan idler 18 engaged, auxiliary motor 20 on, drive 21 engaging flywheel 16, low voltage to takeup motor on takeup reel 12.

(3) 1½ i.p.s. reverse: gate open, capstan idler 18 engaged, auxiliary motor 20 on, idler wheel 23 engaged between drive 21 and flywheel 16, low voltage to rewind motor on supply reel 11.

(4) High speed forward: gate open, capstan idler 18 disengaged, low voltage to rewind motor on reel 11, high voltage to takeup motor on reel 12.

(5) High speed rewind: gate open, capstan idler 18 disengaged, low voltage to takeup motor on reel 12, high voltage to rewind motor on reel 11.

The normal position of the gate is closed; it is opened when a solenoid is energized. The normal position of the capstan idler 18 is disengaged; it is engaged when solenoid 19 is operated.

Figure 4:
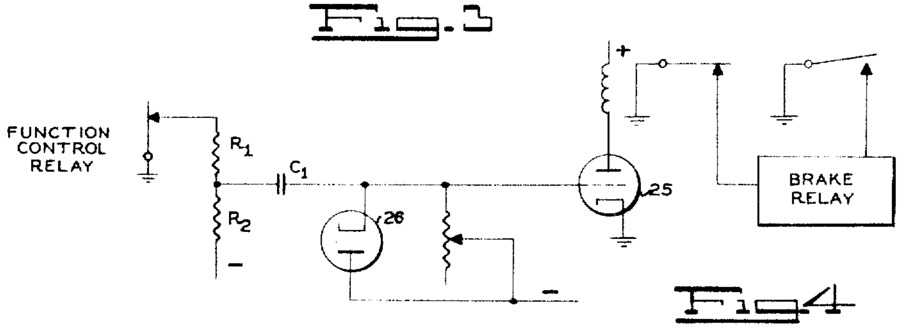
FIG. 4 is a circuit diagram of a brake timer utilized in a preferred embodiment of the invention.

In a preferred embodiment an electromagnetic brake (not shown) is provided on flywheel 16 to stop the tape at the end of any of the above enumerated tape functions. Timers are provided to control the stopping of the tape. The brake timers ensure that, at the end of any function that involves movement of the tape, the brake relay will close automatically, remain closed for the time required to stop the tape, and then open. FIGURE 4 shows a preferred basic circuit of a brake timer.

In this circuit (FIGURE 4) $R_1$ may be on the order of 200 ohms and serves only to protect the relay contact. $R_2$ may be on the order of 20,000 ohms, and $R_3$ about 2 megohms. When the function control relay is unenergized, the right side of $C_1$ is at about −24 volts; the left side of $C_1$ is only slightly negative with respect to ground, as determined by the voltage divider $R_1$–$R_2$. The triode 25 is cut off, and its plate-circuit relay is open. When the function control relay is energized, the left side of $C_1$ rapidly charges to about −24 volts through $R_2$. The diode 26 limits the negative voltage on the right side of $C_1$. When the function control relay is de-energized, the left side of $C_1$ discharges rapidly through $R_1$, and the triode grid goes nearly to ground potential. The triode 25 conducts, its plate-circuit relay closes, and energizes the brake relay. $C_1$ then charges through $R_3$; the plate current drops, and the relay opens. The length of the braking cycle can be controlled by proper selection of $C_1$ and adjustment of $R_3$. In practice, this time is adjusted to secure complete stoppage of the takeup and supply reels and capstan-shaft flywheel, with an added safety factor of about ⅓ second.

The brake pole of the 15 i.p.s. control relay operates a separate brake timer, triode, and plate relay. This plate relay is provided with two poles. One pole operates the brake relay; the other provides an output (ground) whenever the brakes are operating at the end of the 15 i.p.s. function. (This output is used to operate "brake follower" relays in the search program and end-of-tape program circuits to be further described.) The brake poles (normally-closed contacts) of the other four tape function relays are connected to individual timers and triodes. The plates of these four triodes are connected in parallel, and operate a single plate-circuit relay. This relay is connected in parallel with one pole of the 15 i.p.s. brake timer relay, to operate the brake relay.

The brake relay, as previously stated, disconnects the takeup and rewind motors from the A-C source and connects them momentarily to a D-C source. One pole on the brake relay applies the brake to the flywheel. Another is connected in parallel with poles on the tape control relays, as previously explained. Another forms a part of a preferred manual control circuit.

The manual control circuit makes it possible to operate the tape-handling mechanism manually. A toggle switch on the control panel makes it possible to select either manual or automatic operation. The transfer of this switch is conected to ground through two other circuits (the beginning-of-tape detector and the end-of-tape detector, either of which can momentarily open the circuit, as will be explained later), and through a STOP switch—a normally-closed, push-button switch through which the circuit can be interrupted manually to stop any function of the machine, either manual or automatic. One contact of the toggle switch supplies ground to the START and FUNCTION switches, for automatic operation. The other supplies ground, through a normally-closed contact on the brake relay, to the normally-open push-button switches that control manual operation.

The manual control is provided with five push-button switches, one for each of the five tape transport functions (1½ i.p.s. forward and reverse, 15 i.p.s. forward, and high speed forward and reverse). Three of these buttons each energize three-pole relays; the other two—1½ i.p.s. forward and 15 i.p.s. forward—each energize a four-pole relay. On each of the five relays, the first pole operates the corresponding control relay of the tape mechanism; the second pole serves to lock the relay in its energized position; the third poles of all five relays are connected in parallel, and operate a five-pole interlock relay, which opens the circuit to the five push-button switches.

The tape can be set in motion by throwing the toggle switch to manual and pressing any of the five push switches momentarily. This closes and locks the appropriate relay. The interlock relay disables all of the push switches, so that it is impossible to start a new function while the tape is in motion. The specified tape-transport function will continue until the locking circuit is momentarily opened. This may be done in any of several ways:

(1) By throwing the toggle switch to automatic.

(2) By pressing the STOP switch.

(3) If the tape breaks.

(4) If, in any forward speed, the tape on the supply reel is exhausted.

(5) If, during a search at 15 i.p.s., the end of the recorded material on the tape is reached.

(6) If, during rewind, the leader at the beginning of the tape is reached.

Interruption of the circuit by any of these means will unlock the relay, allowing it to open and thus de-energize the tape control relay. When any tape control relay opens, the associated brake timer applies the brakes. While the brake relay is energized, interruption of the manual control circuit is continued through a pole on the brake relay provided for that purpose, so that no new function can be started until the tape has come to rest.

Another push switch on the manual control panel is marked search. This operates a two-pole relay, one pole of which is used for locking. (This relay is not connected to the manual interlock relay.) The second pole provides ground to the transfers of the fourth poles of the 1½ and 15 i.p.s. forward manual control relays. The normally-open contact of this pole on the 1½ i.p.s. forward relay is connected to the primary of the low-speed search relay. The normally-open contact of the fourth pole of the 15 i.p.s. manual control relay is connected to the primary of the 15 i.p.s. search relay. (The purpose of a 15 i.p.s. manual search feature will be explained later.) A 1½ i.p.s. manual search, in conjunction with a TYPEOUT toggle switch, makes it possible to operate the typewriter directly from the tape, and thus test the typewriter and its solenoids, linkages, and associated control circuits, or to check the operation of the record program by a "playback" of data that has just been recorded.

*Basic circuit elements*

Several basic circuits are used repeatedly in various parts of a system constructed in accordance with the invention. These circuits will be briefly explained here. They consist of a "flip-flop" (bistable oscillator) circuit and several types of timing circuits.

Flip-flop circuit. The Eccles-Jordan circuit, using two triodes, is so familiar that it need not be described here. Suitable modifications of this basic circuit may be used in the system, if desired. One such modification makes use of a flip-flop circuit based on two thyratrons. The thyratron circuit has the disadvantage of higher initial cost, shorter tube life and lower maximum speed. However, the thyratrons are required to carry only a small fraction of their rated current capacity, and by this means their life is prolonged. The thyratron circuit has several advantages over the triode vacuum tube circuit. First, the choice of circuit components is less critical, particularly when plate-circuit relays are used. Second, the thyratron circuit makes possible a low-impedance positive voltage across a cathode resistor. Third, use of tetrode thyratrons facilitates "gating" (i.e., when it is desired that the circuit should change its state only when two inputs are simultaneously present).

The flip-flop circuit is the basic memory device of the system. It remembers input 1 and is reset by input 2. The basic circuit may be modified in several ways for specific applications:

(1) A relay may be included in either or both plate circuits.

(2) A resistor may be added in either or both cathode circuits, in order to develop a positive output voltage.

(3) The grid circuit may be modified in various ways to prevent loading of the input circuit when the tube ionizes, or for other purposes.

(4) The normally-off tube may be provided with two input circuits, through its control grid and screen grid so that it will ionize only when both inputs are present simultaneously.

Timers. Three basic timer circuits are used, for three different purposes: 1. When an input appears, an output relay closes, remains closed for a predetermined time and then opens. 2. When the input appears, a delay cycle of predetermined length begins, after which the output relay closes and remains closed until the input is removed. 3. The output relay remains open when no input is present, and while the input is present; it closes for a predetermined interval when the input is removed.

Figures 7, 8:
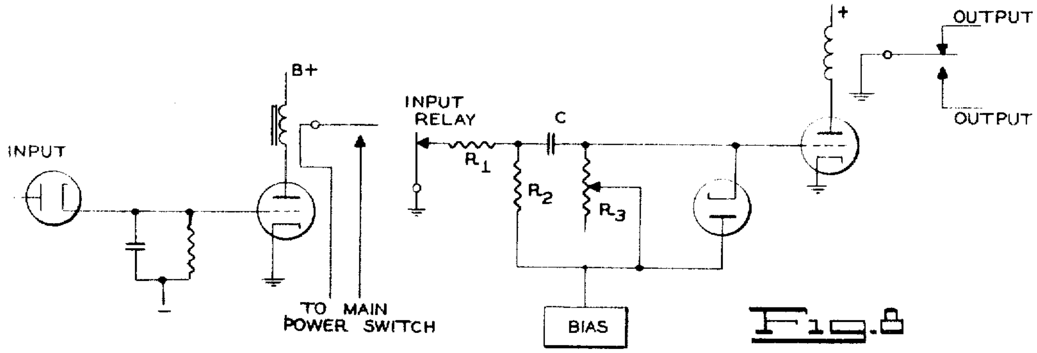
FIG. 7 is a diagram of a power switch bypass utilizable in the invention.
FIGS. 8 and 9 are circuit diagrams of timers utilizable in the invention.

FIGURE 8 illustrates the type 1 timer circuit. The input is through the contacts of a relay or switch. $R_1$ is small and serves only to protect the input relay contacts. When no input is present, $C_1$ is charged to bias potential on both sides and the triode is cut off. When the input appears, the triode grid goes nearly to ground; the triode conducts and the output relay closes. As the grid side of $C_1$ charges to bias voltage through $R_3$, the plate current will drop and at the end of the interval determined by the adjustment of $R_3$, the output relay will open. When the input is removed, the left side of $C_1$ charges to bias voltage through $R_2$ which is small compared to $R_3$. The diode is used to limit the negative voltage appearing on the triode grid; this is necessary when the time between operating cycles of the timing circuit is short.

Figure 9:
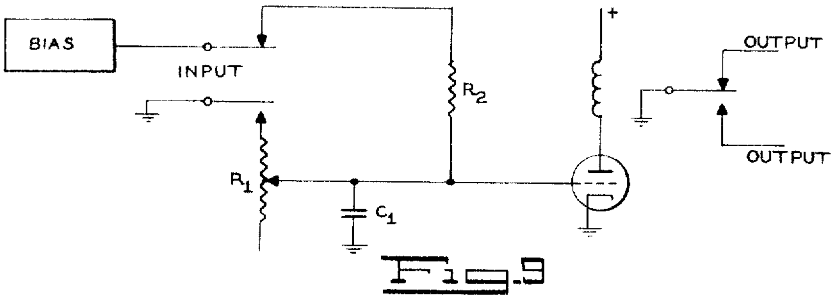

FIGURE 9 represents the type 2 (delay) timing circuit. This circuit requires a two-pole input relay or switch. When no input is present, the triode grid is at bias potential and the tube is cut off. ($R_2$ is small and is used to protect the input contacts.) When the input appears, $C_1$ begins to discharge toward ground potential through $R_1$ and the triode plate current increases. At the end of the delay time determined by the adjustment of $R_1$, the output relay closes. When the input is removed, $C_1$ rapidly charges to bias potential through $R_2$; the triode is again biased to cutoff and the output relay opens.

Figures 23, 24:
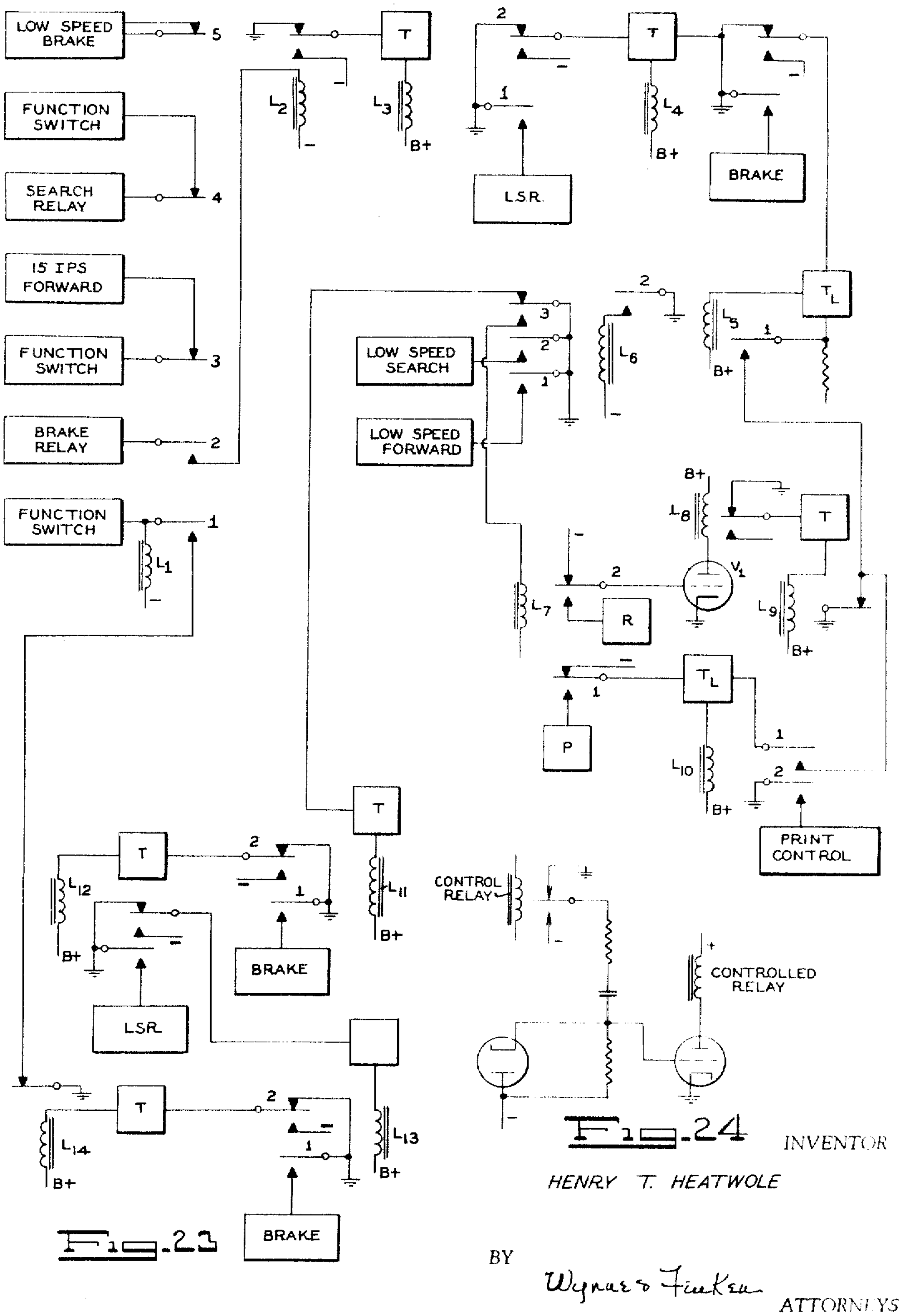
FIG. 23 is a circuit diagram of a search program.
FIG. 24 is a circuit diagram of a timer circuit utilizable in the search program of FIG. 23.

The brake timer circuits, described elsewhere and illustrated in FIGURE 4 are typical of the type 3 timer. An alternative timer cricuit is shown in FIGURE 24.

*Power switch bypass*

This circuit operates a relay, the contacts of which shunt the main power toggle switch. It serves two purposes. The tape reels are stopped by electric braking. Therefore, if the power switch is inadvertently turned off while the tape is in motion, the reels will coast, with a strong possibility of spilling or damaging the tape. Since this circuit shunts the power switch whenever the tape is in motion, it is not possible to interrupt the power connection until the tape comes to rest. This feature makes it possible to begin a search and then turn off the main power switch. The bypass circuit will maintain the power connection until the search is completed. FIGURE 7 is a diagram of the circuit.

With no input, the triode is biased to cutoff. The input (ground) is provided by any tape control relay or by the brake relay. (The diode prevents interference by the end-of-tape latching relay, which is connected to the same input.) The resistance of the diode is small compared to that of the resistor. Consequently, the capacitor discharges nearly to ground potential when an input is present; the plate circuit relay then closes and shunts the power switch. The capacitor keeps the relay from opening during the interval between opening of the tape control relay and closing of the brake relay. When the input is removed the capacitor charges to negative through the resistor; the tube is again cut off and the plate-circuit relay opens. The time constant of the grid circuit is not critical. In practice, it may be anything from a tenth of a second to several seconds.

*Beginning-of-tape detector*

This circuit is preferably used during high-speed rewind to stop the tape when the leader is reached. It does so by momentarily opening the ground connection to the transfer of the auto-manual toggle switch. (It also provides a second out-put, the use of which will be explained later.)

Figure 5:
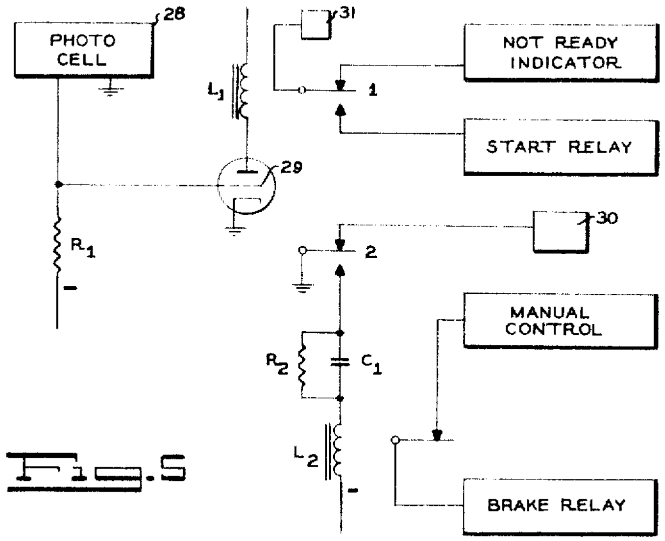
FIG. 5 is a circuit diagram of a beginning-of-tape detector.

The circuit operates photoelectrically. A low-voltage lamp 27 (FIG. 2) is mounted directly below the tape, within the tape-transport gate enclosure. A semiconductor photoelectric cell 28 is mounted in line with the lamp, directly above the tape. When the magnetic tape is between the two, the cell is relatively dark and has a high resistance. When the clear or white leader tape is between the lamp and the photocell, the cell receives sufficient light to lower its resistance significantly. FIGURE 5 shows the circuit of the beginning-of-tape detector.

The triode grid 29 is connected to the midpoint of the voltage divider formed by the photocell and $R_1$. The resistance of $R_1$ is approximately equal to that of the photocell when the latter is dark. Thus, when the cell is dark, the triode is biased at about −15 volts, and its plate current is too low to close relay $L_1$. When light reaches the photocell its resistances drops, and the triode grid bias drops to a point at which plate current is sufficient to operate $L_1$.

When the tape is at any position except the beginning, $L_1$ is unenergized. The normally-closed contact of its pole 2 provides a ground connection to the end-of-tape detector 30 (described later). Because of $R_2$, there is no charge on $C_1$. $L_2$ is unenergized, and its contacts complete the ground circuit of the manual-control relays (in series with a normally-closed pole of the brake relay).

The auto-manual switch, through its "auto" contact, provides a ground connection through the normally-open start button to the function switch 31. When the latter is in either the "search and print" or "search and count" position, the circuit will be completed to the transfer of pole 1 of $L_1$ (FIGURE 5). Assume that the function switch is in one of the search positions, but that the tape is not at the beginning. Since $L_1$ is unenergized, pressing the start button will complete the circuit to the "not ready" indicator lamp on the panel. But if the tape is at the beginning, $L_1$ will be energized, and pressing the start button will complete the circuit to the start relay, which closes and locks. The start relay, through other poles of the function switch, then energizes the "15 i.p.s. forward" and "15 i.p.s. search" relays.

During rewind, when the tape leader is reached and $L_1$ is energized, $C_1$ will charge through the normally-open contact of pole 2 and through the primary of $L_2$. $L_2$ is energized momentarily, thus unlocking the manual control relay and stopping the tape.

The beginning-of-tape detector operates whenever light reaches the photocell. It not only insures that each search would start at the beginning of the tape, and to stop the tape transport at the end of a rewind, but it serves the added purpose of stopping the reels and transport motors if the tape breaks, or if it is wound completely off the supply spool.

*Recording codes*

The invention is readily adaptable to any magnetic tape coding system. Two suitable codes are described herein.

One such code is based on a quaternary code of different amplitudes recorded on two tape channels. The use of a two-channel tape recorder is obviously economical compared to four or more channel tape recorders.

Figure 6:
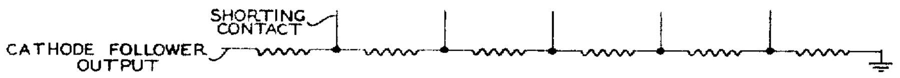
FIG. 6 is a partial circuit diagram of apparatus for providing amplitude coded signals in accordance with one embodiment of the invention.

The basic signal is provided by a Wien-bridge oscillator, the output of which is a sine wave in the low audio-frequency range, with an amplitude of about 10 volts RMS from a cathode follower. This signal is supplied to a voltage divider, from which outputs are taken at five points, as indicated in FIGURE 6.

The upper output contact of the divider is shorted to ground through the normally-closed contact of a relay in the recording program circuit. This relay is energized for a short time during the recording cycle, so that voltages are provided at the other four output taps. The RMS voltages present at the four taps may be, for example: 1, 0.75 v.; 2, 1.5 v.; 3, 3.0 v.; 4, 8.0 v. The requirements are that each succeeding voltage (except the highest) should be twice the next lower voltage, that the three lower voltages can be recorded without distortion, and that the lowest voltage be several times that produced by circuit noise, transients, and hum.

The use of four distinguishable voltage levels on each of two tape channels makes possible 16 distinct coded combinations, which may be used to represent 16 distinct symbols. Any arbitrary code may be used; a suitable code is as follows:

| Character | Channel A (v.) | Channel B (v.) |
|---|---|---|
| 0 | 3 | 3 |
| 1 | 1 | 2 |
| 2 | 1 | 3 |
| 3 | 1 | 4 |
| 4 | 2 | 1 |
| 5 | 2 | 2 |
| 6 | 2 | 3 |
| 7 | 2 | 4 |
| 8 | 3 | 1 |
| 9 | 3 | 2 |
| P | 3 | 4 |
| H | 4 | 1 |
| R | 4 | 2 |
| E | 4 | 3 |

The symbols P, H, R and E are, respectively, print, hyphen, reset and error symbols.

Alternatively, a binary code may be employed, utilizing four channels. A suitable code for such a system is as follows:

| | Channel A | Channel B | Channel C | Channel D |
|---|---|---|---|---|
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 0 | 1 | 0 | 1 | 0 |
| P | 1 | 0 | 1 | 1 |
| R | 1 | 1 | 0 | 0 |
| H | 1 | 1 | 0 | 1 |
| E | 1 | 1 | 1 | 0 |

The P, R, H and E symbols refer to those identified above.

*Record program*

In order to record information on the tape, it is necessary to set the auto-manual switch at automatic, and the function switch at record. The start button is then pressed. If the tape is in the proper position for recording, the start relay will close and lock, and the record relay will close and lock. (The tape is in the proper position for recording if the recording head is just beyond the end of the information, if any, already recorded on the tape.) If the tape is in the wrong position, a "not ready" light will come on when the start button is pressed. The tape may be brought to the proper position by a procedure to be described later.

The "record" section of the panel consists of 14 buttons, marked 0 through 9 and P, H, R, and E, each operating a single-pole microswitch. An input (ground) is supplied to these switches when the auto-manual switch is in the automatic position, the function switch at record, and the start relay closed. Each of the 14 switches has a separate output to the record program circuit. At the record position of the panel is a rotary switch having three positions: automatic, circuit test, and lock. For recording on the tape, the switch is set at automatic. The function of the other positions will be explained further herein.

The record program for each digit consists of two timed steps. Pressing any button starts the first timer. During this time, current is passed through the recording heads. At the end of the first time cycle, this current is interrupted, and the circuit will re-close only when the recording button is released. During the second time cycle of the record program, the tape is advanced to the position at which the next digit will be recorded.

Figure 10:
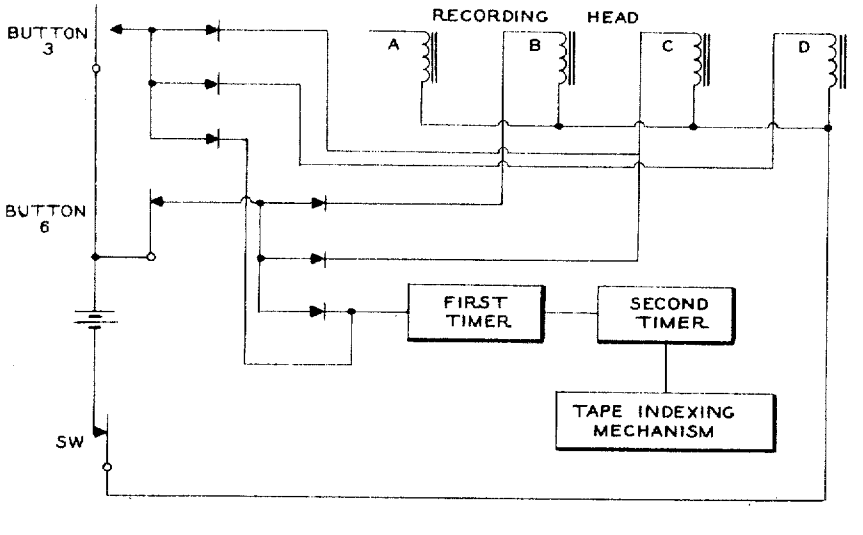
FIG. 10 is a partial circuit diagram of a recording program.
Figure 11:
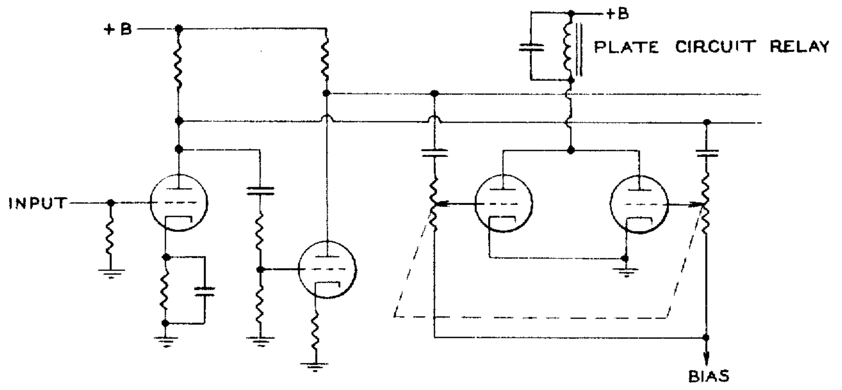
FIG. 11 is a partial circuit diagram of a decoder.

FIGURE 10 illustrates the record button circuit for a 4-channel binary code. In this illustration the digits 3 (code 0011) and 6 (code 0110) are shown. All other buttons are connected in parallel, through diodes to the timing mechanism and to recording heads as determined by the code. Thus, information is recorded on the tape while the tape is standing still. In the circuit of FIG. 10, switch SW is open except during the first time cycle as described above.

For recording a two-channel quaternary amplitude code, such as described above, a similar system may be used. In such case the two recording amplifiers are connected to appropriate taps on the voltage divider of FIG. 6.

If desired, the characters being recorded may be typed out at the same time they are recorded, for an immediate check on accuracy. This may be accomplished by a suitable switch actuating the typewriter control circuits.

*Computer circuitry*

The principal functions performed by the computer circuits are, successively: decode, compare, remember, and correlate. During a search, digits and other symbols are supplied from the tape in the form of coded signals, such as those described herein. In the case of amplitude coded sine waves on two channels, representing voltage analogs of two digit quaternary numbers, decoding takes place in two steps. In the first step, the voltage analog is converted into a two-digit quaternary number in digital form. In the second step the quaternary number is changed to a decimal digit or other coding symbol (P, H, R or E). When a four-channel binary code is employed, decoding to the decimal digit is accomplished in a single step. The decoded numbers are then compared, in decimal form, with those set on the search switches.

Because, in a preferred embodiment, a four-digit subject classification system is used, four-digit numbers must be set on the subject switches of the control panel. The numbers received from the tape one at a time are to be considered in groups of four, each representing one subject. Because the numbers are read singly, a sequential comparing circuit is required. That is, the first of any group of four digits received from the tape must be compared with the first digit of each of the three rows of subject switches; the second of each group of four must be compared with the second digit in each subject, and so on. Sequential comparing may be accomplished by using a thyratron ring counter to successively gate the outputs from the comparing switches to the memory circuit.

The memory circuit consists of 12 thyratron flip-flops, one for each of the four digits of each of the three subjects that may be included in the search. For simplicity of explanation, consider a one-subject search. The first digit to be received from the tape will be compared with that set on the first of the four rotary switches. If they are the same, the first memory circuit will operate. If the second digit received from the tape is the same as that set on the second rotary switch, the second digit memory circuit will operate, and so on. If, after four digits have been received from the tape, all four memory circuits have operated, a subject memory circuit will operate, indicating that the subject set on the switches occurs in the entry searched. After the end of the four-digit signal, the digit memory circuits are automatically reset, so that the next four-digit number received from the tape may be compared with the subjects set on the rotary switches. The subject memory circuit, however, is not reset until it receives the final reset signal which is recorded at the end of each entry.

When the subjects of a tape entry are compared with those set on the search switches, it may be found that none, one, two, or three subjects correspond. A corresponding number of subject memory circuits will be operated. The outputs from these circuits are fed to a correlation circuit, which determines whether or not the number of matching subjects for the entry satisfies the correlation requirements set by the operator on the correlation switch. If so, a correlation relay closes and locks. This relay initiates a timing circuit which operates an electromechanical correlation counter on the control panel. The timer is adjusted to energize the counter for the minimum time that will ensure reliable operation.

If the function switch is set for "search and count," the correlation switch will have no further effect; all memory circuits, as well as the correlation circuit, will be reset at the end of the entry, and the machine will continue to search the tape at relatively high search speed. However, if the function switch is set at "search and type," the search will continue after a correlation only until the print signal is received. A correlation followed by a print signal will initiate the "double take" search program, which will stop the tape, reverse it, search it at low speed, type out all data between the print and reset signals, reverse and then resume the search speed.

The operation is illustrated schematically in FIG. 1, the solid lines indicating the searching operation.

*Comparing circuit*

As previously stated, the operator specifies the subjects to be searched for by setting a 4-digit subject code number on one or more of three rows of rotary switches. Each row represents one subject. Each row consists of four switches, each representing one digit of that subject. Each rotary switch has a single pole and 11 positions (in addition to OFF). The switch positions are marked 0 through 9, and "ANY."

The comparing circuit receives 10 inputs (0 through 9) from junctions of the decoder. When no signal is received from the tape, a negative voltage is present at all 10 inputs to the comparing circuit. When a signal representing one of the 10 digits is received from the tape, the voltage at one of the comparing circuit inputs drops to ground potential, while that at the other nine input points remains negative.

The comparing circuit has 12 separate outputs, one for each digit of each subject, to the memory circuit. These outputs are designated $S_1D_1$ (first digit of first subject), $S_1D_2$ (second digit of first subject), etc. FIGURE 12 represents the contacts of the $S_1D_1$ rotary switch. The output is taken from the transfer. The fixed contact representing the digit "0" is connected to the "0" junction of the decoder. The fixed contact representing the digit "1" is connected to the "1" junction of the second decoder and so forth. Although each of the 12 rotary switches has a separate output, corresponding fixed contacts of all 12 switches are connected in parallel to the inputs.

If the switch (FIGURE 12) is set at OFF, its output circuit is open; if set at ANY, the output is grounded. For other settings, the output varies. When no input signal is present, the output is a negative voltage (from the decoder junction to which the switch transfer is connected). If any signal occurs other than that corresponding to the number at which the rotary switch is set, the output will still be a negative voltage. If an input signal corresponding to the number for which the switch is set occurs the switch output will be a ground potential.

Note than when an input corresponding to any digit 0 through 9 occurs, it will be simultaneously compared with the number set on all 12 rotary switches, and all switches set for that number will provide grounded outputs simultaneously. Thus while the machine as a whole achieves sequential comparing of the separate digits of four-digit numbers, this is accomplished by the digit-counter and memory circuits, not by the comparing circuit.

This machine, by using a comparing circuit based on the decimal system, performs the required function with inexpensive components and minimum wiring. The switches that perform the actual comparing function are the same as those on which the operator sets the subject numbers, and no other components are required. The grounded "ANY" contacts make generic searching possible at no additional cost.

*Digit memory circuit*

The apparatus, according to the invention, compares four-digit numbers set by the operator on rotary switches with four-digit numbers received from the magnetic tape. However, the digits are received from the tape one at a time. For the purpose of this explanation it can be assumed that digit signals are received from the tape (one at a time) in blocks of four (although there is actually no additional tape spacing between the last digit of one subject number and the first digit of the next). If, for any of the three subjects, the first digit received from the tape is the same as that set on the first-digit rotary switch, the machine must remember that fact. It must similarly remember whether or not the second, third and fourth digits received from the tape are the same, respectively, as the settings of the second, third and fourth rotary switches for that subject. Then, after all four digits (representing one subject) have been received from the tape, the apparatus must in effect search its memory to determine whether or not all four of the digits received were the same, respectively, as the four digits set on the subject switches. If so, it must take appropriate action. Finally, after the fourth digit has been received, the digit memory must be cleared, so that if a given tape entry is classified under more than one subject, the next subject can be compared.

Figure 13:
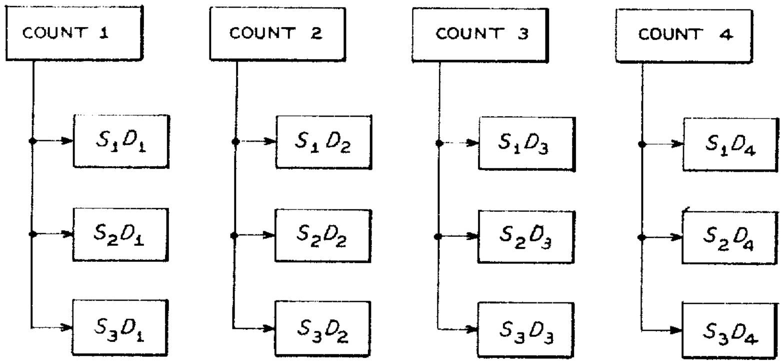
FIG. 13 is a block diagram of a digit memory circuit.

FIGURE 13 is a block diagram of a preferred embodiment of a digit memory circuit. It consists of 12 thyratron flip-flops, each corresponding to one digit of one subject. Each of the 12 flip-flops is represented by a separate block in FIGURE 13. Each receives two inputs: one from the transfer of the corresponding comparing switch, not shown in FIG. 13, and one from the digit counter. The input from the comparing switch is either a negative voltage or ground potential. The input from the digit counter also is either negative or at ground potential. At any given time, the digit counter provides three negative inputs and one grounded input. Each thyratron flip-flop is capable of changing state only when ground-potential inputs are received simultaneously from the digit counter and the comparing circuit.

To understand the operation of the circuit diagrammed in FIGURE 13, it will be assumed that only one subject ($S_1$) is used. (The memory and comparing circuits for the other two circuits act in the same way, and at the same time.) Assume that all memory circuits have been cleared, and that an entry is about to be received from the tape. At the moment, no signal is present. Each of the four comparing switches is supplying a negative voltage to the corresponding thyratron circuit. The "count 1" output is supplying ground potential to the $S_1D_1$ flip-flop. The other three count outputs are negative voltages.

When the first digit is received from the tape, it will appear as a ground potential on one of the output junctions in the decoder. If this digit is the same as that set on any of the four comparing switches, that switch will supply a ground potential to the corresponding flip-flop in the digit memory. However, the $D_2$, $D_3$ and $D_4$ flip-flops are incapable of changing state, regardless of whether or not they receive an input from the comparing circuit, because they are not "enabled" by the digit counter. If, however, the $D_1$ flip-flop receives a ground input from its comparing switch it will change state (i.e. the normally-off tube will ionize and extinguish the other) because it is enabled by the counter.

When the tape signal representing the first digit ends, the first decoder junction representing that digit quickly becomes negative. All outputs from the comparing switches are then negative. During the interval when no signal is coming from the tape, the digit counter advances. The "count 1" channel becomes negative, and the "count 2" channel provides ground potential. The other two counter channels remain negative.

When the second digit is received from the tape, it is compared with the numbers set on all four rotary switches. If this number is the same as that set on switch $S_1D_2$, the $D_2$ flip-flop will change state. If the number is the same as that on the $D_1$, $D_3$ or $D_4$ switches, no effect will be produced since the corresponding thyratron circuits are not enabled by the counter. In the same manner, the $D_3$ and $D_4$ circuits will remember whether or not the third and fourth digits received from the tape are the same as those set on the corresponding rotary switches.

Outputs from the digit memory circuits are supplied to a subject memory circuit (described below). If, after four digit signals have been received from the tape, all four digit memory circuits have been operated, their outputs will operate the corresponding subject memory circuit. The circuit will remember this fact until the end of the entry being received from the tape. After the fourth digit signal ends, the digit counter returns to the "count 1" position. At the same time, it sends a reset pulse to the digit memory circuit. This is a positive pulse applied to the grids of the normally-on tubes of all 12 thyratron flip-flops. As a result, the digit memory (but not the subject memory) is cleared immediately after each four-digit number has been received from the tape.

Figure 14:
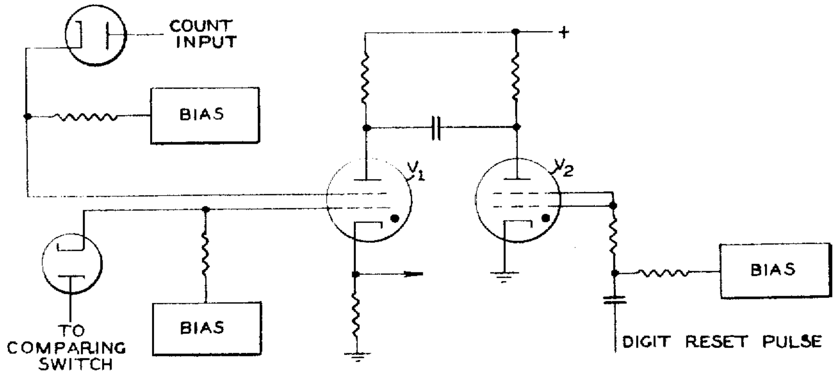
FIG. 14 is a circuit diagram of a thyratron flip-flop utilizable in a digit memory circuit.

FIGURE 14 shows the circuit of a thyratron flip-flop of the digit memory. All 12 of these circuits are identical. The tubes are tetrode thyratrons. $V_1$ is the normally-off tube. Both grids are biased to −6 volts, for example, through a large resistance. The control grid receives an input from the comparing switch, and the screen grid from the digit counter. The input diodes prevent loading of the input circuits when the tube ionizes and ensure that the thyratron bias voltage will be maintained as long as the input circuit is open, or supplies a negative voltage. At the plate voltage used, the tube will remain un-ionized as long as either grid remains more than 1.5 volts negative, for example, (unless the other goes several volts positive).

The high grid resistance is used because the input from the comparing switch cannot provide a direct ground connection. When such an input is present, the actual grid potential is that of a point on a voltage divider between ground and the bias supply, made up as follows: On the ground side are two resistors, in parallel, in the second decoder; this resistance is in series with the input diode. On the bias side are the grid resistors (effectively in parallel) of all digit-memory flip-flops for which the setting of the rotary switch is the same as the incoming digit. The values chosen will ensure positive operation even when the maximum number (ten) of subject switches have the same setting.

In the screen-grid circuit of $V_1$, the ground arm of the voltage divider includes only the input diode; for that reason, the bias resistor may be considerably smaller than that in the grid circuit, if this is considered desirable.

The two grids of $V_2$ are connected in parallel. The digit reset pulse, supplied by the digit counter after the end of each fourth digit signal received from the tape, is applied simultaneously to the normally-on thyratron in each of the 12 circuits.

Each flip-flop in the digit memory provides an output at the cathode of the normally-off tube. This consists of a moderately low-resistance path to ground when the flip-flop is in its normal state and about 20 volts, for example, positive when the circuit is in a remembering state. The plate resistor of $V_2$, which has no cathode resistor, is made larger than that of $V_1$, so that the two tubes will draw approximately the same current. This results in minimum fluctuation of the power supply voltage when the flip-flops change state.

*Subject memory*

A given entry on the tape may be classified under any number of four-digit subjects in the embodiment described. A given search specification may require that two or more specified subjects be found in a given entry before that entry is considered to meet the search conditions. For that reason, if an entry is found to have one of the required subjects, this fact must be remembered until all subjects for that entry have been received from the tape. The machine can then make a final decision as to whether or not the specified correlation has been met, and if so take appropriate action.

Figure 15:
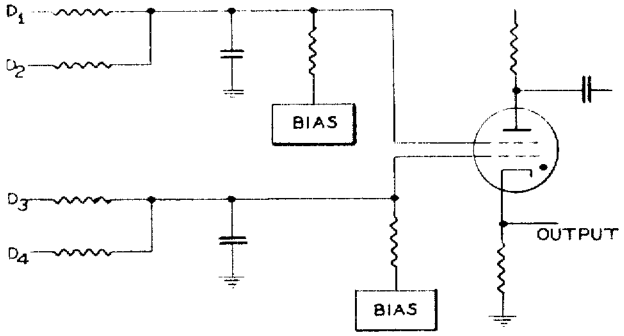
FIG. 15 is a circuit diagram of a subject memory.

The subject memory circuit consists of three identical thyratron flip-flops—one for each subject. FIGURE 15 shows the normally-off tube of one of the three circuits. The circuit has four inputs, from the cathodes of the four digit-memory tubes. All resistors shown are moderately large compared with the cathode resistors of the digit tubes. All four input resistors have the same value—approximately twice that of the bias resistors. The bias is a negative voltage approximately equal to the positive voltage developed at the digit-tube cathodes.

The action at each of the two grids is the same. When neither of the two inputs is present, the grid is at the midpoint of a voltage divider between the bias supply and ground, and its potential is half that of the bias supply. When only one of the two inputs is present, the grid is connected through a one-unit resistance to the bias supply, through a two-unit resistance to ground, and through a two-unit resistance to a positive voltage. Under these conditions the grid potential is in the order of one third that of the bias supply—a value sufficiently negative to ensure tube cutoff even if the other grid is grounded.

Since a negative potential on either grid will keep the tube from ionizing, it is apparent that all four inputs must be present (indicating successful comparison of each of the four digits of that subject) before the subject memory flip-flop will change state.

Outputs are taken from the cathodes of the normally-off tubes of all three subject memory circuits. All three of the normally-on tubes receive a positive pulse from the reset signal detector. This occurs only after the end of a complete entry received from the tape. The on and off tube circuits of each flip-flop are designed to draw equal current, to prevent undue fluctuations of the power supply voltage.

Each grid is supplied with a filter capacitor to ground (FIGURE 15). This is required by the nature of a thyratron flip-flop. Before firing, the thyratron plate is at B-plus potential. When the tube ionizes, its plate voltage drops; but this cannot occur until the coupling capacitor has charged through the tube (and the cathode resistor, if any). Thus, when a thyratron with cathode resistor fires, a high positive voltage appears momentarily on the cathode, falling to a steady value as the coupling capacitor charges. The function of the filter capacitors shown in FIGURE 15 is to round off this positive peak. The capacitance must be sufficiently large to prevent the appearance on the grid of a voltage sufficiently positive to fire the tube prematurely. At the same time, it must be sufficiently small to ensure the return of adequate bias between the time the inputs are removed and the time the main reset pulse is applied.

The bias supply for this circuit is adjustable. In practice, its optimum setting is determined as follows: For each of the three subject memory circuits, determine experimentally the highest bias voltage at which the flip-flop will change state when only the first three inputs from the digit memory have been made. Record the highest of the three values found. Now, for each of the three subject memory circuits, determine experimentally the highest bias voltage at which the flip-flop will change state when all four inputs are made. Record the lowest of the three values found. Then adjust the bias to midpoint between the two recorded values.

An alternative means for operating the subject memory is by use of semiconductor diodes connected to the digit-tube cathodes to form a logical "and" circuit of conventional design. This circuit develops a positive voltage only when all four of the digit-memory tubes are conducting. This positive voltage is used to overcome the negative bias on the grid of the subject-memory tube.

*Correlation circuit*

Figure 16:
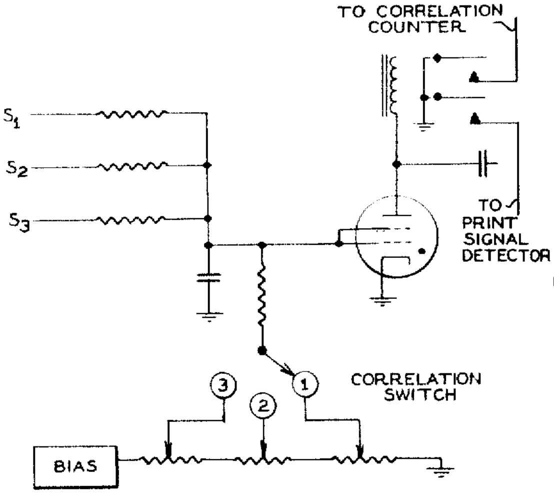
FIG. 16 is a partial circuit diagram of a correlation circuit.

The correlation circuit is required to provide suitable outputs when any one, two, or three subjects in a single entry on the tape are the same as subjects set on the search switches on the panel. The number of subjects required is specified by the operator by setting a rotary switch on the panel at 1, 2 or 3. The circuit is based on a thyratron flip-flop, the normally-off tube of which is shown in FIGURE 16.

The circuit receives three inputs, from the cathodes of the three subject memory tubes. The four resistors connected to the grids are large in comparison with the cathode resistors of the subject memory tubes, and with the voltage divider in the bias supply circuit. The three input resistors are identical, and each is about three times the value of the resistor between the grids and the transfer of the correlation switch. The operation of this circuit is very simple. The grids are, in effect, at a point on a voltage divider. The positive voltage supplied by the inputs varies, depending on the number of subject memory tubes developing a voltage. The negative bias voltage supplied is variable, depending on the setting of the correlation switch. If the number of subject memory inputs is equal to or greater than the number set on the correlation switch, the grid bias is reduced to ground potential or to a positive value, and the flip-flop changes state. If the number of subject memory tubes operated is less than the number set on the correlation switch, the positive voltage supplied at the inputs is insufficient to overcome the bias voltage at the grid, and the circuit does not change state. The correlation flip-flop is reset by the main reset pulse developed after each entry from the tape has ended.

The three correlation bias voltages may be adjusted as follows: Set the correlation switch at 1. Determine experimentally the lowest bias that will keep the normally-off tube from ionizing when no input is present. Record this value. Then, for each of the three subject memory inputs, determine the highest bias voltage at which the single input will operate the correlation flip-flop. Record the lowest of these three values. Set the "1" bias midway between the two recorded values.

Set the correlation switch at 2. For each combination of two inputs, determine the highest bias voltage that will permit operation of the correlation flip-flop when those two inputs are present. Record the smallest of the three values. Now determine the lowest bias that will keep the correlation tube cut off when any one input is present. Set the "2" bias midway between this and the previously recorded value.

Set the correlation switch at 3. Determine the highest bias at which the correlation tube will operate when all three inputs are present. Determine the lowest voltage at which it will remain cut off when any two inputs are present. Set the "3" bias midway between these values.

Various alternative correlation circuits are possible. For example, the cathodes of the subject-memory tubes may be connected to three separate logic circuits based on semi-conductor diodes. The output of any one of these three circuits may be connected to the grid of the correlation tube through the correlation switch. When the switch is set at "1," the output is taken from an "or" circuit; when it is set at "2," the output is taken from a "2-out-of-3" circuit; and when it is set at "3," the output is taken from an "and" circuit.

As a second alternative, subject "hits" may supply pulses to an electric counter based on triode flip-flops. The point on the counter from which an output is taken is determined by the setting of the correlation switch. The counter is returned to zero by the reset signal at the end of the entry.

*Typewriter control circuit*

In a preferred embodiment, an electric typewriter is used as the print out means. The circuit (not shown) consists of 14 triodes, each with a plate-circuit relay. The relay contacts supply A-C line current to the solenoids that operate the characters of the electric typewriter. The grid of each triode is connected to the appropriate junction of the decoder (except the grid of the "P" tube when the function switch is set at "search and print," which is then connected to the bias supply). Thus all grids are biased to a point that will preclude operation of the plate-circuit relay, except when an input is received from the decoder.

All 14 cathodes are connected in parallel, and grounded through a common cathode resistor. This resistor is sufficiently large to prevent relay operation, even when the grids are grounded. The circuit is "enabled," and will then cause the typewriter to print the characters received from the decoder, when the common cathodes are connected to ground through one or more switch or relay contacts. As previously noted, this enabling connection may be supplied in any of several ways.

*Reset signal detector*

The reset signal detector provides a positive output pulse to reset the thyratron flip-flops of the print-signal detector, the correlation circuit, and the subject and digit memories. The reset symbol, as received from the tape during a low-speed search, is used as a signal to the typewriter for line space and carriage return. The main reset pulse must therefore be generated after reception of the "R" symbol from the tape has ended, in order to give the typewriter time to operate.

Figure 17:
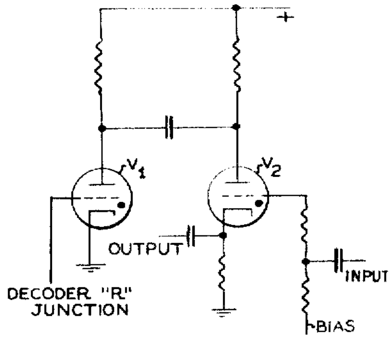
FIG. 17 is a circuit diagram of a reset signal detector.

The circuit is based on a thyratron flip-flop, as shown in FIGURE 17. $V_1$ is the normally-off tube; its grid is connected directly to the "R" junction of the decoder. This tube is therefore supplied with cutoff bias except during the time the reset symbol is received in the decoder. The grid of $V_2$ receives the count pulse generated by the decoder after the end of each digit input from the tape. But since $V_2$ is normally on, this pulse normally has no effect. The voltage at the cathode of $V_2$ remains steady, and no output pulse is generated.

When the reset symbol appears at the end of a tape entry, the "R" junction of the decoder goes to ground potential. $V_1$ then fires, cutting off $V_2$. The cathode of $V_2$ goes to ground potential, and its plate to B-plus supply potential, during the time the reset signal is being received from the decoder. After this signal ends, the "R" junction of the decoder, and therefore the grid bias of $V_1$, becomes negative. The decoder then produces the digit count pulse, which fires $V_2$. As the coupling capacitor charges through $V_2$, a high positive voltage appears momentarily on the $V_2$ cathode, providing the main reset pulse that clears all memory circuits in the computer section of the machine.

*Print signal detector*

Figure 18:
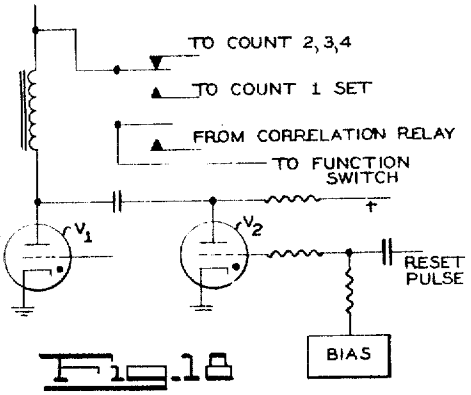
FIG. 18 is a circuit diagram of a print signal detector.

This circuit is based on a thyratron flip-flop, as shown in FIGURE 18. $V_1$ is the normally-off tube. When the "P" signal is received from the decoder, $V_1$ fires; a double-pole relay in its plate circuit closes, and remains closed until $V_2$ is fired by the main reset pulse. One pole of the relay controls the B-plus supply to the digit counter, as explained below. The other provides a ground connection output (in series with the correlation relay). This output is developed when the print signal appears, provided the entry being searched has met the specified search conditions. If the function switch is set at "circuit test," this output enables the typewriter control circuit. If the function switch is set at "search and print," this ouput initiates the "double take" search program described above.

*Digit counter*

This circuit has two functions. First, it provides ground outputs successively on four channels, to successively enable the four stages of the digit memory. Second, after the end of each block of four digits received from the tape, it provides a reset pulse to clear the digit memory for the next subject.

Figure 19:
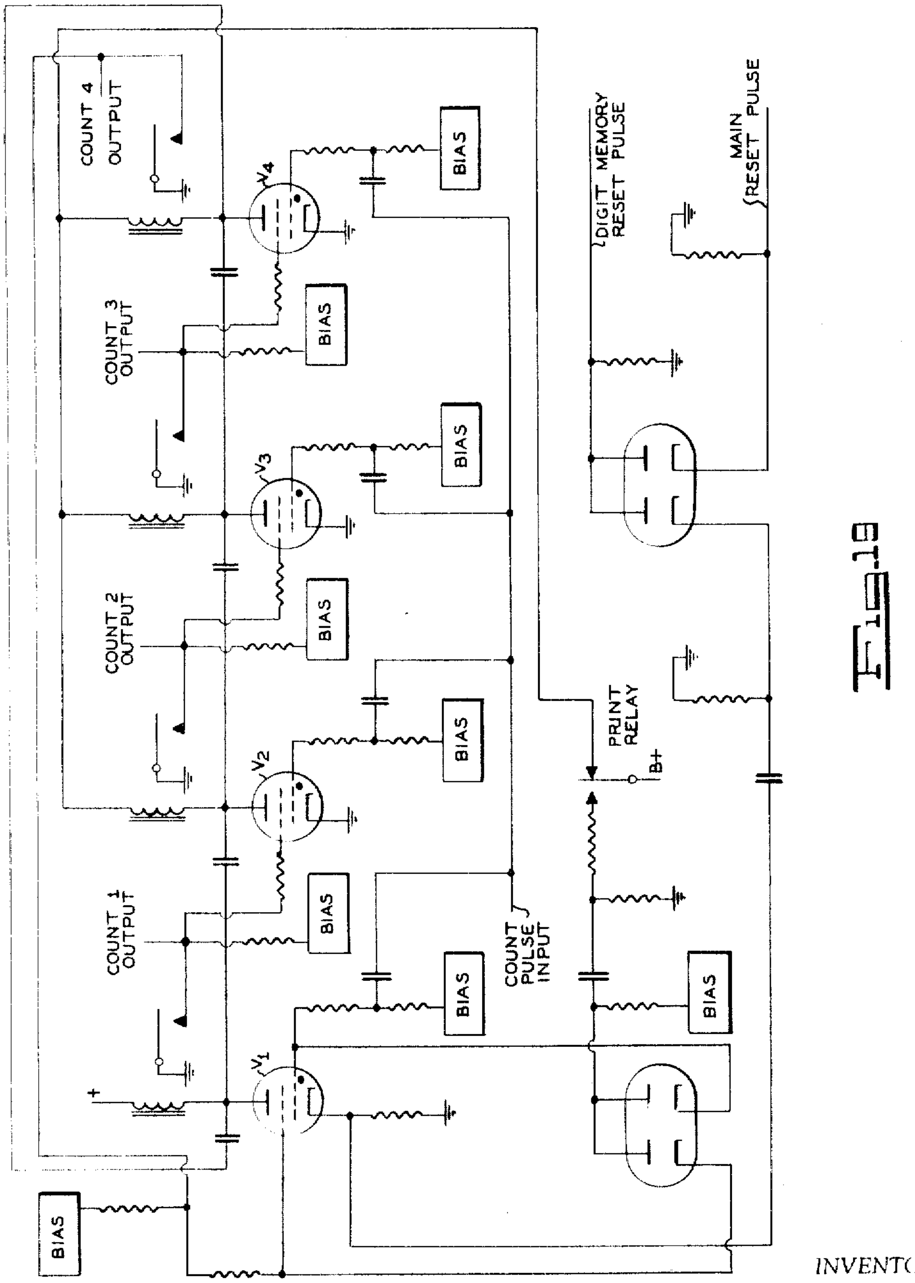
FIG. 19 is a circuit diagram of a digit counter.

The circuit is based on a four-step thyratron ring counter, as shown in FIGURE 19. Four tetrode thyratrons are used. Each is supplied with a high speed plate-circuit relay. The relay of $V_1$ is connected directly to the positive voltage supply. The other three relays are connected to B-plus through the normally-closed contact of one pole of the print signal detector relay (see above).

At the instant before an entry begins to come from the tape, the print relay is un-energized, and all four tubes are supplied with B-plus. $V_1$ is ionized; the other three tubes are not. The plate circuit relay of $V_1$ is closed, providing a ground output which enables the three $D_1$ tubes in the digit memory. The other three count outputs are at a negative potential. The control grids of all four tubes are supplied with cutoff bias. Cutoff bias is present on the screen grids of all tubes except $V_2$, where it is shorted to ground by the "count 1" output.

After the end of the first digit that comes from the tape, a count pulse input is received from the decoder. This pulse momentarily grounds all four control grids. $V_1$, which is already ionized, will not be affected. $V_3$ and $V_4$ will be prevented from ionizing by the screen grid bias. But $V_2$, the screen grid of which is grounded, will ionize and its relay will close. The plate potential of $V_2$ drops, sending a negative pulse in both directions through the plate coupling capacitors. This pulse extinguishes $V_1$, and its relay opens. The output is thus shifted from "count 1" to "count 2." The $D_2$ tubes of the digit memory are now enabled, and the other three outputs are negative. The screen grids of all four counter tubes are now at cutoff bias, except that of $V_3$, which is grounded through the "count 2" output.

The appearance of the "count 2" output is delayed, first by the time required to charge the plate coupling capacitors through $V_2$, and second by the time required for the relay transfer to move to the normally-open contact. The duration of the count pulse, and the time constants of the grid circuits, are such that cutoff bias will be returned to the control grid of $V_3$ before its screen grid is grounded by the "count 2" output. This ensures that the counter will advance by only one step for each input pulse.

Opening of the $V_1$ relay is delayed by the necessity for discharging the coupling capacitors through the relay primary. For this reason it is conceivable that the "count 1" and "count 2" outputs are momentarily present at the same time. But this has no effect because the counter changes state during the interval between digits received from the tape, and the "count 1" channel becomes negative before the second digit appears in the second decoder.

The count pulse that follows the second digit ionizes $V_3$, which extinguishes $V_2$, and the "count 3" output appears. In the same way "count 4" appears after the third digit. Note that "count 4" grounds the screen grid of $V_1$. Therefore, the count pulse that follows the fourth digit (at the end of a subject) will return the counter to the "count 1" position. When $V_1$ conducts, its plate coupling capacitors are charged through the tube. As a result, a high positive voltage appears momentarily on its cathode. This supplies the reset pulse that clears the digit memory. Not that the main reset pulse is also supplied to the digit memory, to ensure that it will be cleared at the beginning of the next entry. The two resets are diode-coupled to the digit memory, to prevent the digit reset pulse from resetting the subject memory and other circuits supplied with the main reset pulse.

The counter will count digits, in groups of four, for any number of subjects under which an entry may be classified. The print signal appears at the end of the subjects and is followed by an identifying number which will, under certain conditions, be printed by the typewriter. This number may consist of any desired number of digits or other symbols. If the counter is allowed to count these symbols, it will probably be out of step at the beginning of the next entry. For this reason, the count is discontinued when the print signal appears. (See FIGURE 19.)

When the print relay operates, B-plus is removed from the plates of $V_2$, $V_3$, and $V_4$. If, for any reason, one of these tubes is conducting, it will be extinguished. The print relay applies B-plus to a voltage divider, from which a positive pulse is provided through separate diodes to the grid and screen grid of $V_1$. If $V_1$ is conducting (as it should be) when the print signal appears, this pulse will have no effect. But if for any reason $V_1$ is not conducting, it will be ionized when the print signal appears.

This feature is required for two reasons. First, a recording error, such as omission or duplication of one of the digits of a four-digit subject, will throw the digit counter out of step, and void all or part of the entry. The pulse provided to $V_1$ corrects the counter error, so that only the erroneous entry will be voided. Second, it is apparent that when the power is first turned on, none of the count tubes will conduct (since the bias voltage is developed before B-plus in all circuits of the machine). For that reason a "P" symbol, followed by an "R" signal, is recorded before the first entry on each tape. This ensures that the counter will provide a "count 1" output at the beginning of each entry.

When the main reset pulse occurs, the print signal detector is returned to normal state, and its relay opens. B-plus will then be returned to the plates of the second, third and fourth count tubes. The count pulse that follows the reset symbol will not be counted, since it will have disappeared during the time required for the transfer of the print relay to return to its normally-closed contact.

The use of plate-circuit relays in the digit counter limits the maximum speed at which the circuit can function. However, the maximum searching speed of the machine is limited by the nature of its "double take" system. The maximum speed can be estimated as follows: The maximum tape speed on a production model tape recorder, for example, is 15 i.p.s. The maximum speed at which a production model electric typewriter can be operated appears to be something less than 10 characters per second. While typing from the tape, characters must be received at a speed no greater than the typewriter can handle. The limiting speed is the speed of the typewriter, multiplied by the ratio of 15 i.p.s. to the lowest speed at which the tape can be reliably recorded and searched. Use of a faster printing device, or of a tape transport with a higher ratio of searching speeds, requires a higher speed counter without relays.

Figures 20, 21:
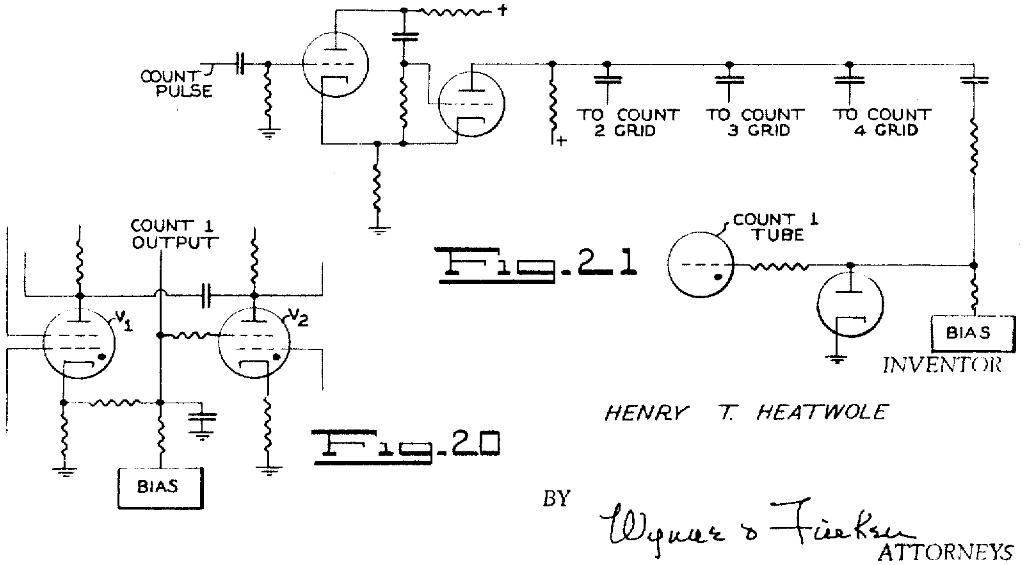
FIGS. 20 and 21 are partial circuit diagrams of portions of a high speed counter.

A suitable high-speed counter is shown in part in FIGURE 20. This circuit, in which the grids are biased to cut-off, receives positive count pulses as previously described. All four tubes are provided with cathode resistors. Each screen grid is connected to the midpoint of a voltage divider between the bias supply and the cathode of the preceding tube. Thus when the preceding tube is not conducting, the screen potential will be approximately half that of the bias supply. The voltage divider is so designed that when the preceding tube is conducting, the screen potential will drop approximately to ground. The small filter capacitor is used to round off the positive peak resulting from charging of the plate coupling capacitor through the previous tube.

To secure maximum speed, the value of the plate coupling capacitors must be reduced to the minimum value that will permit reliable extinguishing of the thyratrons. Since firing voltage quickly returns to the plates, and since the screen potential of successive tubes is changed very rapidly, the duration of the count pulse input must be strictly controlled, to keep the counter from advancing two or more steps on a single input. This may be accomplished by the input circuit shown in FIGURE 21.

The count pulse is applied to a one-shot multivibrator (FIGURE 21), and four separate outputs are taken from the plate of the normally-conducting tube. Circuit components may be chosen to provide an output of approximately 0.0001 second duration. The output pulse is applied through a voltage divider to the bias supply, with the thyratron grid connected at the midpoint. The diode limits the signal on the grid to a square wave of 0.0001 second duration, and a maximum positive potential of a small fraction of one volt with respect to ground. The short grid pulse ensures that, when one thyratron fires, grid bias will return to the succeeding tube before its plate and screen potentials permit it to ionize.

*End-of-tape program*

When the operator wishes to record additional entries on a tape that already has recorded material on it, he sets the function switch to "record," and presses the start button. If the tape is in the proper position for recording, the recording relay will close and lock. It will then be possible to record simply by pressing the numbered keys of the record panel. If the tape is not in the proper position for recording, a "Not Ready" indicator lamp will flow when the start button is pressed. The operator may then bring the tape to the recording position by manual control of the tape mechanism.

The tape is in recording position when the last entry on the tape is about one inch beyond the recording heads. When the tape is in this position, a mechanically latching end-of-tape relay is closed. The circuit to the recording relay is completed through the contacts of the end-of-tape relay. The unlatching coil of this relay is energized, through a normally-closed contact of the recording relay, when any motor in the tape transport mechanism is operated. The mechanically latching relay makes it possible for the machine to "remember" that the tape is in recording position, even after the power has been turned off. If the tape is moved for any reason, except while actually recording, the relay will be unlatched and it will no longer be possible to record.

The latching coil is automatically energized by the end-of-tape program at the end of every search. Thus, if the operator rewinds the tape only before searching, the tape will always be ready to record except when a search is in progress.

During a normal search (at 15 i.p.s., for example), the end-of-tape program circuit monitors the output of the first decoder. The program will be enabled when the first digits appear from the tape. If, at any time thereafter, no digits are received for a period of about half a second (representing a tape advance of about 7 inches), the program circuit will stop the tape, back it up to the proper point, and energize the latching relay. However, if the search is discontinued, or if the double-take feature operates, the end-of-tape program will be disenabled, and the relay will not latch. At the end of printing during a double take, the program will be re-enabled when the 15 i.p.s. search is resumed.

If it is desired to record when the tape is not in recording position, it can be brought to that position as follows: Switch to manual tape control and advance the tape at high speed to the approximate position for recording. Stop the tape, and press the 15 i.p.s. and search buttons. If the recording position has been passed, this will be shown by the fact that the indicator neon lamps on the panel do not flash. In that case, back up the tape a short distance and then return to the 15 i.p.s. search. When the end of the recorded material is reached, the end-of-tape program circuit will bring the tape to recording position and latch the relay. When the tape stops, the operator may switch to automatic control, press the start button and then record.

Figure 22:
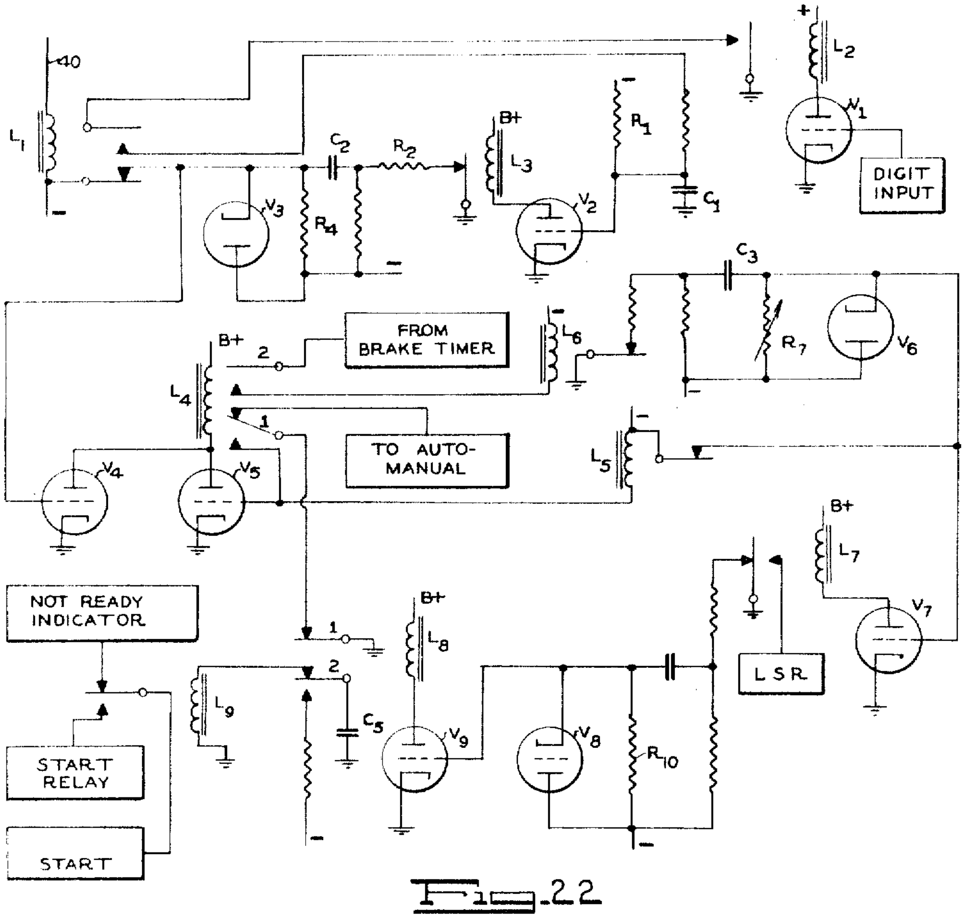
FIG. 22 is a circuit diagram of an end-of-tape program.

FIGURE 22 shows the circuit of a suitable end-of-tape program. The grid of $V_1$ is connected to the decoder circuit. When no signal is received from the tape, the grid of $V_1$ is supplied with a negative bias from the decoder. As digits are received from the tape, the grid of $V_1$ is intermittently grounded. Thus $V_1$ and the high-speed plate-circuit relay $L_2$ serve as a digit repeater, the output of which is an intermittent ground when digits are being received from the tape, and an open circuit when no digits are received. The purpose of the repeater is to prevent excessive loading of the second decoder by $C_1$. $L_1$ is energized at 40 when the beginning-of-tape relay is open and the 15 i.p.s. search relay is closed. Then, when digits are received from the tape, $C_1$ will be discharged. The frequency of the intermittent ground connection supplied during a 15 i.p.s. search, in conjunction with the time constant of $C_1R_1$, keeps the grid of $V_2$ at approximately ground potential as long as digits are received. When the grid of $V_2$ is grounded, $L_3$ is energized, allowing the right side of $C_2$ to charge to −28 volts. $V_3$ is a limiter to prevent excessive bias on the grid of $V_4$.

Now, if the tape reaches the end of the recorded material, and no further digits are received, the contact of $L_2$ will remain open and $C_1$ will begin to charge toward −30 volts. At the end of about half a second, $V_2$ is cut off and $L_3$ is de-energized. The right side of $C_2$ will be grounded through $R_2$ and the grid of $V_4$ will go from −28 to approximately ground potential. $V_4$ will conduct for a short time (determined by $R_4$ and $C_2$) which is sufficiently long to close the contacts of $L_4$.

But if the search is interrupted before the end of the recorded material is reached, the 15 i.p.s. search relay will open; $L_1$ will be de-energized and its No. 1 pole will apply −28 volts directly to the grid of $V_4$, thus preventing the end-of-tape program from operating.

When $L_4$ is momentarily energized by $V_4$, its No. 1 pole grounds the grid of $V_5$ (and energizes $L_5$). The current through $L_4$ is maintained through $V_5$; thus $L_4$ is, in effect, a locking relay. The No. 1 pole of $L_4$ opens the ground connection to the auto-manual switch. This automatically opens the 15 i.p.s. forward and 15 i.p.s. search relays and initiates the 15 i.p.s. brake timer cycle. A second pole on the 15 i.p.s. brake timer relay provides ground potential through the No. 2 pole of $L_4$ to energize $L_6$. Thus $L_6$ is a 15 i.p.s. brake follower. At the beginning of the brake cycle, $L_6$ is energized, thus preparing the timer made up of $C_3$, $R_7$ and $V_7$. When the brake cycle ends, $L_6$ is de-energized and the timer operates. $L_7$ is energized for a time determined by $C_3$ and the adjustment of $R_7$. While $L_7$ is energized, it moves the tape in a low speed reverse. The adjustment of $R_7$ is made so that the tape is brought back to within one inch of the last recorded digit.

(Because of the long time constant of $C_3$ and $R_7$, $L_5$ is provided so that the $C_3$ may charge quickly when the power is first turned on, to prevent unintended operation of $L_7$ and consequent latching of the end-of-tape relay when the tape may be in the wrong position.)

When $L_7$ is energized, the timer made up of $C_4$, $R_{10}$ and $V_9$ is prepared for operation. When $L_7$ is de-energized, the $V_9$ timer operates for a time slightly longer than that required to complete the automatic brake cycle that follows the low-speed reverse motion of the tape. When $L_8$ is energized by $V_9$, its No. 1 contact opens the ground connection to the grid of $V_6$, thus unlocking $L_4$. At the same time, it maintains the interruption of the ground connection to the auto-manual switch, thus preventing any movement of the tape before the end-of-tape program is completed.

The No. 2 pole of $L_8$ permits $C_5$ to charge to −28 volts. When $L_8$ is de-energized, $C_5$ discharges through the primary of the mechanically-latching relay $L_9$. The value of $C_5$ must be sufficiently high to ensure reliable latching.

*Search program circuit*

This circuit automatically controls the tape transport, search relays, and printing circuit to accomplish the double-take and printout when a correlation is detected. The steps by which this is accomplished are as follows:

(1) When a correlation occurs, the following print signal initiates the program. The circuit to the 15 i.p.s. forward tape control and to the 15 i.p.s. search relay are opened. A timed brake cycle follows automatically. The connection between the low-speed tape control relays and the associated brake timer is opened so that low-speed brake cycles are accomplished by the program circuit, rather than automatically, while the search program is in progress.

(2) At the end of the 15 i..p.s. brake cycle, the tape is moved in low-speed reverse for an accurately controlled time. This is to move the tape back to a point one inch before the print signal that initiated the program. The uniformity of stopping at 15 i.p.s. and the accuracy of the timer are sufficient to accomplish this result within half an inch.

(3) At the end of the above low-speed reverse cycle, the brakes are applied long enough to ensure that the tape comes to a stop.

(4) At the end of the brake cycle (3), the tape moves forward at low speed, and the low-speed search relay closes. Through two additional relay contacts which are closed at this time, a print-signal and reset-signal detector within the program circuit are connected, respectively to the "P" and "R" junctions of the decoder.

(5) When the print signal is detected, the print control circuit is enabled and symbols received from the tape will thereafter be printed. (The "P" itself is not printed because the circuit between the "P" junction of the decoder and the print control circuit is open when the function switch is set in its "search and print" position.)

(6) After the end of the reset signal at the end of the entry, the print control circuit is disenabled and the low-speed forward and low-speed search relays are opened. The brakes are then applied.

(7) At the end of the brake cycle, the tape moves in low-speed reverse for about an inch and a half. The brakes are then applied.

(8) At the end of the brake cycle, the machine automatically resumes its 15 i.p.s. forward search.

The entire program takes approximately five seconds.

A simplified diagram of the search program circuit is shown in FIGURE 23. The circuit consists essentially of a series of electronically timed relays. Each relay, when energized, controls one of the operations listed above. When de-energized, at the end of its timed cycle, it initiates the following timing circuit. In FIGURE 23 the symbol T enclosed in a box indicates a timer. FIGURE 24 illustrates a suitable timer for this application. The timing circuit is inactive and the controlled relay is unenergized as long as the preceding (control) relay is unenergized. When the control relay is energized, and then de-energized, the timing cycle begins and the controlled relay is energized for the length of the cycle.

The duration of the timed cycle is of course determined by the R–C values in the triode grid circuit. When critical timing is required, a variable resistor and the regulated bias are used.

The boxed symbol $T_L$ in FIGURE 23 represents a plate-circuit relay which is electronically locked by an input signal of short duration; its circuit is similar to that associated with $V_4$, $V_5$ and $L_4$ in FIGURE 22.

In FIGURE 23, $L_1$ is the search program relay; it is shown at the upper left in the figure. During a search at 15 i.p.s., this relay is normally unenergized. It is supplied with a ground input through the correlation and print relays in series and through pole 7 of the function switch when the latter is in either the "search and print" or the "search program test" position. When $L_1$ receives an input from the print relay following a correlation, it closes and locks (through pole 1 and through the normally-closed contact of $L_{14}$).

$L_1$ has five poles. When it is energized, pole 5 opens the circuit between the low-speed tape control relay and its associated brake timer. Poles 3 and 4 open the circuits to the 15 i.p.s. forward and the 15 i.p.s. search relays. Pole 2 supplies the ground signal from the "brake follower" pole of the 15 i.p.s. brake timer relay to the primary of $L_2$. Thus $L_2$ follows the brake relay when the 15 i.p.s. motor is stopped.

When $L_2$ is de-energized at the end of the 15 i.p.s. brake cycle, it initiates the timer that controls $L_3$. While $L_3$ is energized, it closes the low-speed reverse relay. When $L_3$ is de-energized, it initiates the timer that controls $L_4$ which operates a brake cycle. At the end of this cycle, $L_4$ is de-energized and initiates the locking timer that controls $L_5$ which locks through its pole 1 and through the normally-closed contact of $L_9$. The second pole of $L_5$ operates $L_6$, one pole of which operates $L_7$. (It is obvious that $L_5$ and $L_6$ and and $L_7$ can be a single relay if a 6-pole plate-circuit relay is available or it can be two 3-pole plate-circuit relays in series or parallel.)

When $L_6$ is energized, the low-speed forward and low-speed search relays are energized. When $L_7$ is energized, the grid of $V_1$ (which has been biased to cutoff) is connected to the "R" junction of the decoder and a grid of the locking timer on pole 1 is connected to the "P" junction in the decoder. The machine searches at low speed until the print signal is received when $L_{10}$ closes, and locks through pole 1 and the normally-closed contact of $L_9$. The print control circuit is enabled through pole 2 of $L_{10}$; it prints all symbols received thereafter until the reset signal appears, at which time it operates the line-space and carriage return of the typewriter.

When the reset signal appears, $L_8$ is energized for the duration of the signal. When $L_8$ is de-energized, it operates a timer that momentarily energizes $L_9$, thus unlocking $L_{10}$ and $L_5$. When $L_5$ is unlocked, $L_6$ is de-energized and initiates the timer that controls $L_{11}$. $L_{11}$ applies the brakes of the tape mechanism then initiates the timer that controls $L_{12}$. $L_{12}$ reverses the tape for a short distance after which it initiates the timer that controls $L_{13}$.

$L_{13}$ applies the brakes, after which it initiates the timer that controls $L_{14}$. $L_{14}$ is energized momentarily, thus unlocking $L_1$. The machine then automatically resumes its 15 i.p.s. search.

*Test features*

This system is preferably constructed so that the operation of its circuits may be monitored or tested at will. The recording and typing circuits, the computer circuits and the beginning-of-tape, end-of-tape and search programs can be quickly tested from the control panel, without opening the cabinet. A wire is brought to the panel from the plate of the normally-off tube of each thyratron flip-flop and the plates of the counter thyratrons and the No. 1 tubes of the decoder. The wires are connected through resistors and neon indicator lamps to the B-plus supply. Various indicator lamps will flash continually during any function, thus providing a general indication of circuit operation.

The function switch has two test positions: "circuit test" and "search-program test." The "circuit test" position opens the connection to the tape transport relays, but supplies power to the record keys. If the "printout" toggle switch is now turned to "on," the typewriter will type the appropriate digit or letter when any record switch button is pressed. This provides a quick test of the record program, the two decoders and the typewriter control circuit.

To test the accuracy of actual recording on the tape, record an entry in the normal manner. Then switch to manual tape control, reverse the tape a short distance, throw the print-out switch to "on" and press the "low-speed forward" and "search" buttons on the manual control panel. The typewriter will then type out what has been recorded on the tape.

A rotary switch on the recording section of the panel has three positions, "automatic," "circuit test" and "lock." In the first position, the timer in the record program operates manually. This position is used for normal recording and to check the decoders and print control circuits as mentioned above. The "lock" position disables the record program timer and permits the main timing relay and coding relay to remain locked. Thus the two-channel code voltages for any desired symbol may be made continuously available so that they may be measured and adjusted. A normally-closed push-button switch in the locking circuit makes it possible to unlock the relays. In the "circuit test" position of the record rotary switch, a coded output is present as long as one of the recording switch buttons is depressed and is removed when the button is released. This position, in conjunction with the "circuit test" position of the main function switch, makes it possible to test the computer circuitry.

The lighting of a flip-flop neon indicator lamp indicates that the normally-off tube has fired. When the lamp is extinguished, it indicates that the normally-on tube has fired. By causing an indicator lamp to go on, then off, both tubes of the corresponding flip-flop can be tested.

With both rotary switches at "circuit test," press the P recording switch button. The P indicator lamp will go on, and remain on after the button is released, since the print control relay locks. The "count 1" indicator lamp should go on when P is pressed. Now press R. The R indicator lamp should go on when the switch button is depressed; P and R should both go off when the button is released. The count should remain at 1. Now press any four record switch buttons (other than P); the count should advance through 2, 3 and 4 and return to 1.

*Decoder test.*—In each channel, the No. 1 indicator is lighted when no input is present. Press the H recording button and observe the A channel indicators; No. 1 should go off and Nos. 2, 3 and 4 should go on. When the H switch button is released, No. 1 should go on and Nos. 2, 3 and 4 should go off. Repeat this test for channel B by pressing and releasing the P recording switch button. If the lamps behave as stated above, all of the first decoder tubes are operating. If the quick check (by typing directly from the recording switch buttons) indicates improper decoding and the decoder tubes are good, the coded oscillator output voltages should be checked; if these are proper, the decoder sensitivity requires adjustment.

*Testing memory, comparing, and correlation circuits.*—Set the correlation switch at 3 and set three different subjects on the search switches. While watching the $S_1$ digit memory indicator lamps, press the record switch buttons correspondingly to the first subject. The four indicator lamps should light successively as the buttons are pressed. As the fourth digit input is made, the $S_1$ subject memory indicator lamp should go on. As the record switch button is released after the fourth digit, the four digit-memory lamps should go out, while the subject memory lamp remains on. Repeat this test for the second and third subjects. After the third subject is completed, the correlation indicator lamp should go on. Finally, press R. When the R switch button is released, the three subject memory lamps and the correlation lamp should go out.

If the indicator lamp of any flip-flop fails to light at the proper time, it probably indicates a faulty normally-off tube. If the indicator fails to go out at the proper time, it probably indicates a faulty normally-on tube. However, if a number of associated tubes fail to operate properly, the trouble is probably a faulty input; other parts of the circuit should then be tested to determine the cause.

*Search program test.*—With the function switch in this position, the machine operates as it does during a normal search, except that the search relays remain open. No symbols are received from the tape; instead, they are simulated by use of the recording switch buttons. Press the start button to start the test. The tape should move forward at 15 i.p.s. Set one or more subjects on the search switches and set the correlation switch as desired. Press the record switch buttons as required to produce a correlation, then press P. The tape should stop, reverse, then move forward at low speed. Press several record switch buttons (other than P) at random; the symbols should not be typed. Press P then several more buttons at random; all symbols following P should now be typed. Finally, press R. The typewriter should line space and return its carriage. The tape should stop, reverse, then move forward at 15 i.p.s.

Beginning-of-tape program. Switch to manual tape control. If the leader is in the recorder gate, press high speed forward to move the tape several feet, then press STOP. Finally, press "high speed rewind." The tape should rewind and stop automatically with the leader in the gate.

End-of-tape program. In manual control, move the tape at high speed to the approximate end of the recorded material. Stop the tape and switch to 15 i.p.s. search. If the decoder indicator lights fail to flash, the end of the recorded material has been passed; stop the tape, reverse it a short distance and try again. Watch the decoder indicator lamps carefully; the program should function approximately half a second after the lights stop flashing.

There have thus been described and illustrated preferred embodiments of a system utilizing the principles of the invention. The system described eliminates the buffer or intermediate storage mechanisms heretofore employed. The systems also may make use of inexpensive components, such as an ordinary electric typewriter with minor modifications. Systems built in accordance with the invention are able to search at the rate of about 100–200 digits per second in the relatively high speed search program. The double-take operation permits the read out of desired information at speeds within the capability of production model typewriters.

While the invention has been described in terms of certain embodiments, such embodiments are to be considered illustrative rather than limiting and it is intended that the invention encompass all modifications and further embodiments that fall within the spirit and scope of the appended claims.

I claim:

1. Apparatus for retrieving address information corresponding to correlated subject information from a magnetic tape having recorded thereon a plurality of addresses and a plurality of subjects corresponding to each said address, the subjects being in the form of multi-digit numbers, said subjects having been recorded in blocks contiguous to the address to which they correspond; comprising first selecting means comprising a plurality of multi-pole switches, each switch corresponding to a digit in the multi-digit subject number and each being manually settable to the desired digit in the desired subject number, second selecting means for selecting the desired correlation of subjects, detecting means for detecting subjects, means for moving said tape in a forward direction at relatively high speed past said detecting means, first control means responsive to said first selecting means and said detecting means for comparing subjects selected by said selecting means, second control means responsive to said second selecting means and said comparing means for correlating subjects and responsive to a satisfaction of the desired correlation of subjects for stopping said tape, means for moving said tape in the reverse direction a predetermined distance and stopping said tape, means for moving said tape at relatively low speed in a forward direction past said detecting means, and read out means operatively associated with said detecting means for reading out the address corresponding to said desired correlation of subjects while said tape is moving forwardly at said relatively low speed.

2. Apparatus set forth in claim 1 wherein said switches include an ANY pole, means operatively associated with said ANY pole for disabling said selecting means whereby said selecting means generically selects all characters corresponding to a digit in said multi-digit number.

References Cited

UNITED STATES PATENTS

| | | | |
|---|---|---|---|
| 2,954,546 | 9/1960 | Burns | 340—174.1 |
| 2,856,256 | 10/1958 | Carman | 340—174.1 |
| 2,900,132 | 8/1959 | Burns et al. | 235—61.7 |
| 2,904,777 | 9/1959 | Cox et al. | 340—172.5 |

PAUL J. HENON, *Acting Primary Examiner.*

G. SHAW, *Assistant Examiner.*